(12) United States Patent
Nishimura et al.

(10) Patent No.: US 9,810,306 B2
(45) Date of Patent: Nov. 7, 2017

(54) DIFFERENTIAL DEVICE

(71) Applicant: MUSASHI SEIMITSU INDUSTRY CO., LTD., Toyohashi-shi, Aichi (JP)

(72) Inventors: Naoya Nishimura, Toyohashi (JP); Hiroyuki Mori, Toyohashi (JP)

(73) Assignee: Musashi Seimitsu Industry Co., Ltd., Aichi (JP)

(*) Notice: Subject to any disclaimer, the term of this patent is extended or adjusted under 35 U.S.C. 154(b) by 58 days.

(21) Appl. No.: 14/918,150

(22) Filed: Oct. 20, 2015

(65) Prior Publication Data
US 2016/0123449 A1 May 5, 2016

(30) Foreign Application Priority Data

Oct. 22, 2014 (JP) .................................. 2014-215611
Oct. 7, 2015 (JP) .................................. 2015-199797

(51) Int. Cl.
*F16H 48/08* (2006.01)
*F16H 48/40* (2012.01)

(52) U.S. Cl.
CPC ....... *F16H 48/08* (2013.01); *F16H 2048/405* (2013.01)

(58) Field of Classification Search
CPC ............................ F16H 48/08; F16H 2048/405
USPC ................................................. 475/230, 248
See application file for complete search history.

(56) References Cited

U.S. PATENT DOCUMENTS

| 755,280 | A | * | 3/1904 | Detriok | F16H 48/08 475/244 |
| 1,061,450 | A | * | 5/1913 | Coleman | F16H 48/08 475/223 |
| 1,128,429 | A | * | 2/1915 | Fetzer | F16H 48/06 475/222 |

(Continued)

FOREIGN PATENT DOCUMENTS

| CN | 101033790 A | 9/2007 |
| DE | 10223944 A1 | 3/2003 |
| DE | 102007040479 A1 | 3/2009 |
| GB | 2391050 A | 1/2004 |
| JP | H0290450 U | 7/1990 |
| JP | 2001214963 A | 8/2001 |
| JP | 3085125 U | 4/2002 |
| JP | 2002-364728 A | 12/2002 |
| JP | 2004-076845 A | 3/2004 |
| JP | 2005048903 A | 2/2005 |
| JP | 2008089147 A | 4/2008 |
| JP | 4154381 B2 | 9/2008 |
| JP | 211038546 A | 2/2011 |
| JP | 4803871 B2 | 10/2011 |
| JP | 5742778 B2 | 7/2015 |
| WO | 2010146444 A1 | 12/2010 |
| WO | 2015106962 A2 | 7/2015 |

OTHER PUBLICATIONS

Official communication dated Aug. 1, 2017 issued over the corresponding Chinese Patent Application 201510686305.7.

*Primary Examiner* — Ramya Burgess
*Assistant Examiner* — Timothy M Hannon
(74) *Attorney, Agent, or Firm* — Carrier Blackman & Associates, P.C.; William D. Blackman; Joseph P. Carrier

(57) ABSTRACT

In a differential device, paired side gears include shaft portions and intermediate wall portions formed in a flat plate shape intersecting an axis of the output shafts, the intermediate wall portions integrally connecting the shaft portions to toothing portions of the side gears separated outward from the shaft portions in a radial direction of an input member, respectively. Each of the intermediate wall portions is formed with a width in the radial direction which is longer than a maximum diameter of a pinion. A cover portion includes a boss portion and a side wall portion connected to the boss portion and having an outer side surface as a surface orthogonal to the axis of the output shafts. A back surface of at least one of the intermediate wall portion and the toothing portion is supported on an inner side surface of the side wall portion.

13 Claims, 17 Drawing Sheets

(56) References Cited

U.S. PATENT DOCUMENTS

| | | | | |
|---|---|---|---|---|
| 1,437,692 A | * | 12/1922 | Tolson | F16H 48/08 475/223 |
| 2,196,368 A | * | 4/1940 | Thomson | B62D 11/16 475/1 |
| 2,489,859 A | * | 11/1949 | Butterworth | F16H 48/08 192/61 |
| 3,253,483 A | * | 5/1966 | McCaw | F16H 48/29 475/226 |
| 5,749,801 A | * | 5/1998 | Teraoka | F16H 48/08 475/88 |
| 6,413,181 B2 | | 7/2002 | Okada | |
| 6,964,629 B2 | | 11/2005 | Tsung | |
| 9,140,352 B2 | | 9/2015 | Inukai et al. | |
| 2007/0213166 A1 | | 9/2007 | Gassmann | |
| 2012/0264559 A1 | * | 10/2012 | Mayr | F16H 48/24 475/220 |

* cited by examiner

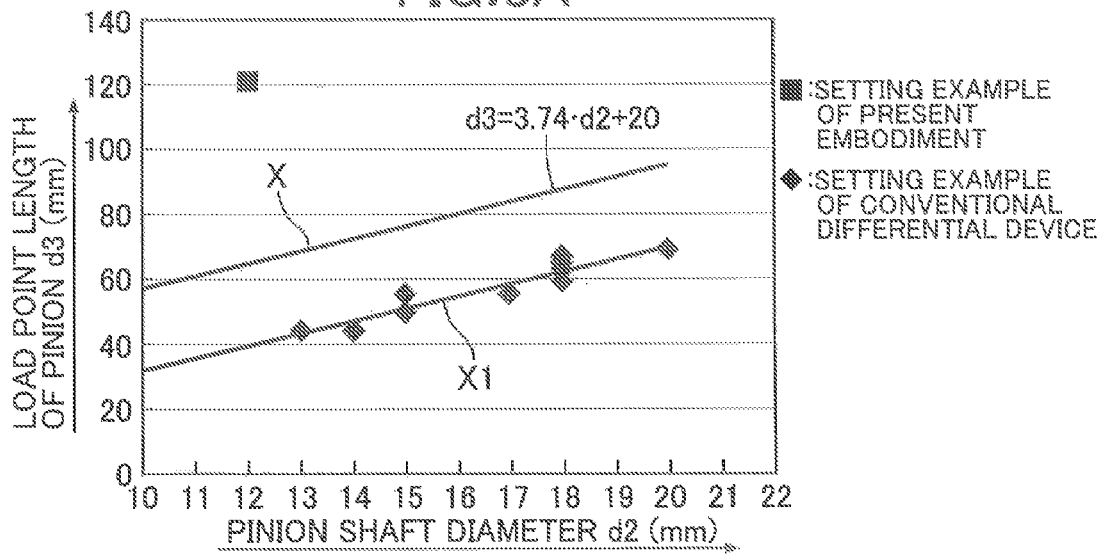
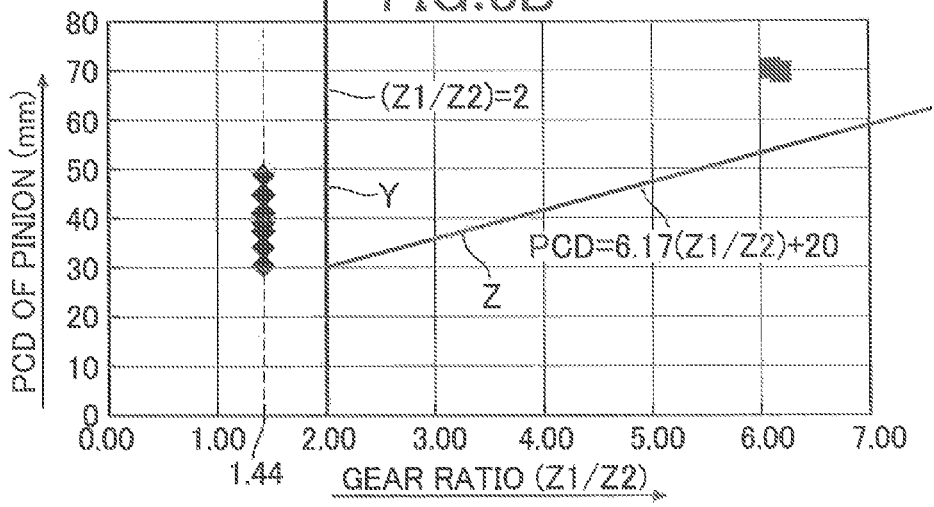
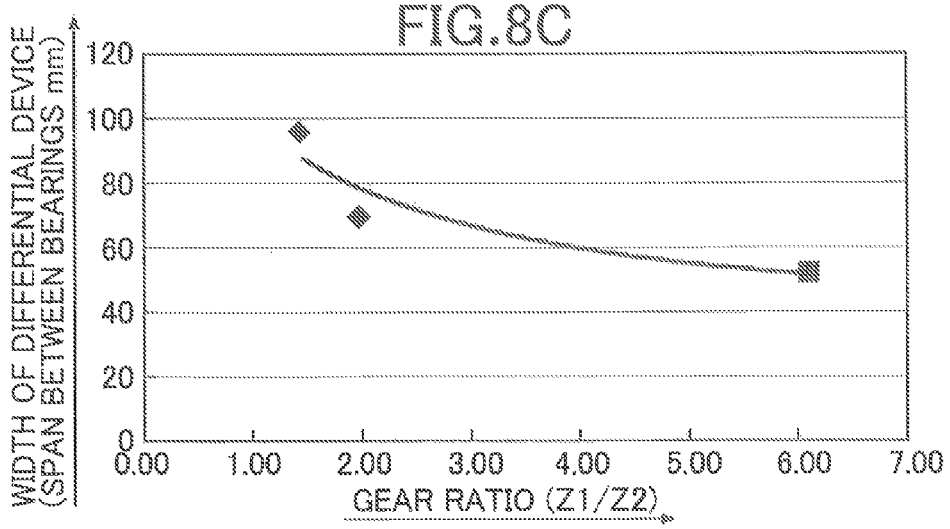

DIFFERENTIAL DEVICE

BACKGROUND OF THE INVENTION

Field of the Invention

The present invention relates to an improvement of a differential device which distributively transmits rotational force of an input member to a pair of mutually-independent output shafts, the input member retaining a pinion support portion that supports a pinion and being rotatable together with the pinion support portion. Particularly, the present invention relates to an improvement of the differential device that includes: a pair of side gears each having an outer peripheral portion which includes an annular toothing portion in mesh with the pinion, and connected to the pair of output shafts, respectively; and a cover portion covering an outside of at least one side gear of the side gears and rotating integrally with the input member.

Description of the Related Art

Conventionally, such a differential device is widely known as disclosed in, for example, Japanese Patent No. 4803871 and Japanese Patent Application KOKAI Publication No. 2002-364728.

The design of a differential device has been desired to be improved such that each of the side gears can have a sufficiently large diameter to have a sufficiently larger number of teeth than the number of teeth of each pinion, and that the side gears and the cover portions arranged outside of the side gears can be reduced in thickness in the axial direction of the output shafts. However, the conventional differential device has not been improved sufficiently in the aforementioned points, and the differential device itself still has a structural form relatively wide in the axial direction of the output shafts. This may cause undesirable things such as: difficulty in incorporating the differential device in a transmission system under many layout restrictions around the differential device; increase in the size of the transmission system as a whole due to the incorporation of the differential device therein; and the like.

SUMMARY OF THE INVENTION

The present invention has been made with the foregoing situation taken into consideration. An object of the present invention is to provide the differential device which can solve the above-discussed problems.

In order to achieve the object, a differential device according to the present invention, distributively transmits rotational force of an input member to a pair of mutually-independent output shafts, the input member retaining a pinion support portion that supports a pinion and being rotatable together with the pinion support portion, wherein the differential device comprises: a pair of side gears each having an annular toothing portion in mesh with the pinion in an outer peripheral portion and connected to the pair of output shafts, respectively; and a cover portion covering an outside of at least one side gear of the side gears and rotating integrally with the input member, wherein the pair of side gears include shaft portions connected to the pair of output shafts, respectively, and intermediate wall portions formed in a flat plate shape intersecting an axis of the output shafts, the intermediate wall portions integrally connecting the shaft portions to the toothing portions separated outward from the shaft portions in a radial direction of the input member, respectively, each of the intermediate wall portion is formed with a width in the radial direction which is longer than a maximum diameter of the pinion, the cover portion includes a boss portion concentrically surrounding the corresponding shaft portion, and a plate-shaped side wall portion connected to the boss portion and having an outer side surface as a surface orthogonal to the axis of the output shafts, and a back surface of at least one of the intermediate wall portion and the toothing portion is rotatably supported on an inner side surface of the side wall portion. (This is a characteristic of the present invention.)

According to the first characteristic, the side gears include: the shaft portions connected to the output shafts, respectively; and the intermediate wall portions each formed in the flat plate shape intersecting the axis of the output shafts, and integrally connecting the shaft portions to the toothing portions of the side gears separated outward from the shaft portions in the radial direction of the input member, respectively. In addition, each intermediate wall portion is formed with the width in the radial direction which is longer than the maximum diameter of the pinion. Thus, the diameter of each side gear can be sufficiently larger than that of the pinion such that the number of teeth of the side gear can be set sufficiently larger than the number of teeth of the pinion. This makes it possible to reduce load burden to the pinion support portion in transmission of torque from the pinion to the side gears, and thus to achieve reduction in the effective diameter of the pinion support portion and accordingly reduction in the width of the pinion in the axial direction of the output shafts. Furthermore, since reaction force applied to each side gear decreases with the reduction in the load to burden to the pinion support portion as described above, and since the back surface of the intermediate wall portion or the toothing portion of the side gear is supported on the side wall portion of the cover portion, the thickness of the intermediate wall portion of the side gear can be sufficiently reduced while securing the support rigidity to the side gear. Moreover, since the side wall portion of the cover portion is formed in the plate shape in which the outer side surface of the side wall portion is the surface orthogonal to the axis of the output shafts, the thickness of the side wall portion of the cover portion itself can be reduced as well. Thus, the differential device of the present invention as a whole can be sufficiently reduced in width in the axial direction of the output shafts while securing strength (for example, static torsion load strength) and the maximum amount of torque transmission at approximately the same levels as the conventional differential device. Accordingly, the differential device can be easily incorporated in a transmission system, which is under many layout restrictions around the differential device, with great latitude and no specific difficulties, and is therefore advantageous in reducing the size of the transmission system.

In the differential device according to the present invention, preferably, the intermediate wall portion of the at least one side gear is formed with a maximum thickness in an axial direction of the output shafts which is smaller than an effective diameter of the pinion support portion. (This is a second characteristic of the present invention.)

According to the present invention, the thickness of the intermediate wall portion of the side gear can be reduced as described above. In addition, according to the second characteristic of the present invention, the maximum thickness of the intermediate wall portion of the side gear can be formed much smaller than the effective diameter of the pinion support portion which can be reduced in diameter. Thus, the differential device can be further reduced in width in the axial direction.

In the differential device according to the present invention, preferably, the input member has an input toothing portion which receives the rotational force from a power source in an outer peripheral portion, and the side wall portion of the cover portion is disposed within a width of the input member in the axial direction of the output shafts. (This is a third characteristic of the present invention.)

According to the third characteristic, the side wall portion of the cover portion is disposed within the width of the input member, which has the input toothing portion in the outer peripheral portion, in the axial direction of the output shafts. Thus, the differential device can achieve a further reduction in the width in the axial direction of the output shafts with the side wall portion of the cover portion kept from protruding outward beyond an end surface of the input member in the axial direction of the output shafts.

In the differential device according to the present invention, preferably, a relationship expressed with d3≥3.74·d2+20 is satisfied, where d2 denotes an effective diameter of the pinion support portion and d3 denotes a load point length of the pinion. (This is a fourth characteristic of the present invention.)

According to the fourth characteristic, the relationship expressed with $$d3 \geq 3.74 \cdot d2 + 20$$

is satisfied, where d2 denotes the effective diameter of the pinion support portion and d3 denotes the load point length of the pinion. Thus, the load point length of the pinion can be sufficiently lengthened and the differential device can be sufficiently reduced in width in the axial direction of the output shafts, while securing static torsion load strength at a level approximately the same as or greater than that of the conventional differential device.

In the differential device according to the present invention, preferably, the pinion and the toothing portion of each of the side gears are bevel gears, and relationships expressed with Z1/Z2≥2, and PCD≥6.17·(Z1/Z2 )+20 are satisfied, where PCD denotes a pitch cone distance of the pinion, Z2 denotes the number of teeth of the pinion and Z1 denotes the number of teeth of the side gear. (This is a fifth characteristic of the present invention.)

According to the fifth characteristic, the relationships expressed with $$Z1/Z2 \geq 2, \text{ and}$$

$$PCD \geq 6.17 \cdot (Z1/Z2) + 20$$

are satisfied, where PCD denotes the pitch cone distance of the pinion formed of a bevel gear, Z2 denotes the number of teeth of the pinion and Z1 denotes the number of teeth of each side gear. This enables the differential device to be sufficiently reduced in width in the axial direction of the output shafts, while securing the maximum amount of torque transmission at a level approximately the same as or greater than that of the conventional differential device.

Note that, in the present invention, "the effective diameter of the pinion support portion" refers to an outer diameter d2 of a shaft as the pinion support portion (in the present embodiment, a pinion shaft PS or a support shaft portion PS') which is formed separately from or integrally with the pinion so as to support the pinion and so as to be attached to the input member.

In addition, in order to achieve the object, a differential device according to the present invention, comprises: an input member into which driving force is input; a differential gear support portion supported in the input member; a differential gear supported on the differential gear support portion; and a pair of output gears in mesh with the differential gear and relatively rotatable to the differential gear, wherein $$d2/PCD \leq 3.36 \cdot \left(\frac{1}{Z1}\right)^{\frac{2}{3}} \cdot \sin\left(\tan^{-1}\frac{Z1}{Z2}\right)$$

is satisfied, and

Z1/Z2>2 is satisfied, where Z1, Z2 , d2 and PCD denote the number of teeth of each of the output gears, the number of teeth of the differential gear, a diameter of the differential gear support portion and a pitch cone distance, respectively. (This is a sixth characteristic of the present invention.)

According to the sixth characteristic, the differential device as a whole can be sufficiently reduced in width in the axial direction of the output shafts while securing the strength (for example, the static torsion load strength) and the maximum amount of torque transmission at approximately the same levels as the conventional differential device. Accordingly, the differential device can be easily incorporated in a transmission system, which is under many layout restrictions around the differential device, with great latitude and no specific difficulties, and is therefore advantageous in reducing the size of the transmission system.

In the differential device according to the present invention, preferably, Z1/Z2≥4 is satisfied. (This is a seventh characteristic of the present invention.)

In the differential device according to the present invention, preferably, Z1/Z2≥5.8 is satisfied. (This is an eighth characteristic of the present invention.)

According to the seventh and eighth characteristics, the differential device can be more sufficiently reduced in width in the axial direction of the output shafts while securing the strength (for example, the static torsion load strength) and the maximum amount of torque transmission at approximately the same levels as the conventional differential device.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 3A shows the input member having an inner peripheral surface which is formed by joining two arcs with the same diameter, and FIG. 3B shows the input member having an inner peripheral surface with an elliptic shape.

FIG. 5A shows a modified embodiment in which a washer retaining groove is provided to the cover portion, FIG. 5B shows a modified embodiment in which the washer retaining groove is provided to a back surface of a toothing portion of a side gear, FIG. 5C shows a modified embodiment in which the washer retaining groove is omitted by positioning and retaining a washer by using an overhanging portion of an inner side surface of the cover portion, and FIG. 5D shows a modified embodiment in which an intermediate wall portion of the side gear is disposed closer to a pinion shaft side by decreasing a diameter of an intermediate portion of the pinion shaft.

FIGS. 8A to 8C are graphs for comparing a setting example of the differential device of the embodiment and a setting example of a conventional differential device, FIG. 8A shows a relationship between a pinion shaft diameter and a load point length of a pinion, FIG. 8B shows a relationship between a gear ratio of the side gear and the pinion and a pitch cone distance of the pinion, and FIG. 8C shows a relationship between the gear ratio and a width in an axial direction of the differential device.

DESCRIPTION OF THE PREFERRED EMBODIMENTS

Embodiments of the present invention will be described based on the drawings.

Figure 1:
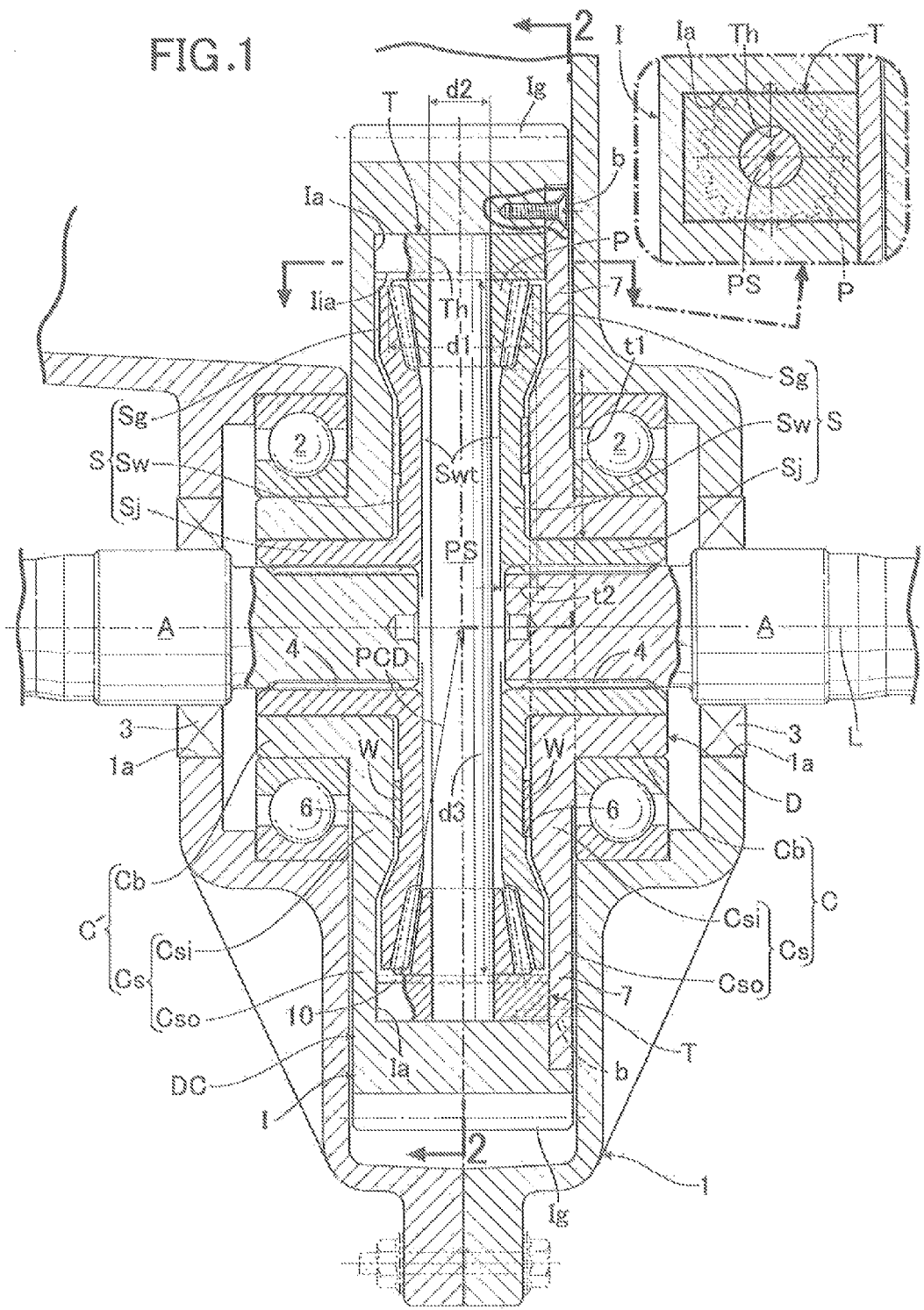
FIG. 1 is a longitudinal sectional view of a differential device and its vicinity of an embodiment of the present invention (a sectional view taken along a 1-1 line in FIG. 2).
Figure 2:
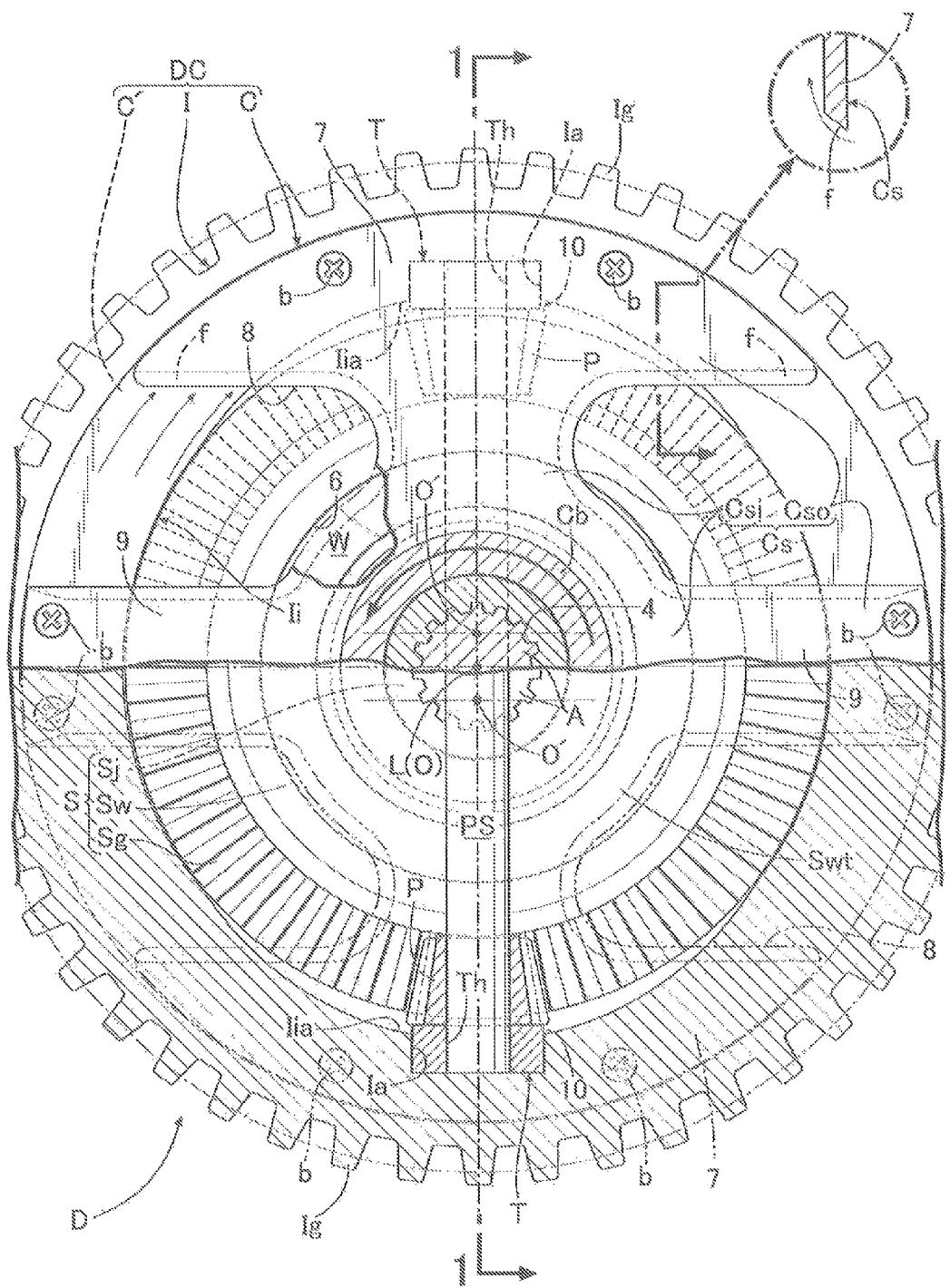
FIG. 2 is a partially cutaway side view of the differential device (a sectional view taken along a 2-2 line in FIG. 1).

To begin with, in FIGS. 1 and 2, a differential device D drives a pair of left and right axles while allowing differential rotation thereof, by distributively transmitting rotational driving force, which is transmitted from an engine (not illustrated) mounted on an automobile, to a pair of left and right output shafts A continuous to the left and right axles. The differential device D is housed and supported, for example, inside a transmission case 1 fixed to the center of a rear portion of a vehicle body.

The differential device D includes: multiple pinions P; a pinion shaft PS as a pinion support portion which rotatably supports the pinions P; an input member I having a short cylindrical shape and supporting the pinion shaft PS so as to be capable of rotating together with the pinion shaft PS; a pair of left and right side gears S in mesh with the pinions P from both the left and right sides, and connected respectively to the pair of left and right output shafts A; and a pair of left and right cover portions C, C' covering outer sides of the respective side gears S, and rotating integrally with the input member I. A differential case DC is formed from the input member I and the cover portions C, C'.

Incidentally, the embodiment shows the differential device D which includes two pinions P, and whose pinion shaft PS as the pinion support portion is formed in a linear rod shape extending along one diameter line of the input member I with the two pinions P respectively supported by both end portions of the pinion shaft PS. Instead, the differential device D may include three or more pinions P. In this case, the pinion shaft PS is formed in a shape of crossing rods such that rods extend radially from a rotation axis L of the input member I in three or more directions corresponding to the three or more pinions P (for example, in a shape of a cross when the differential device D includes four pinions P), and tip end portions of the extending rods support the pinions P, respectively.

In addition, the pinions P may be fitted to the pinion shaft PS directly as shown in the illustrated example, or with bearing means (not illustrated), such as a bearing bush and the like, interposed between the pinion shaft PS and each pinion P. Furthermore, the pinion shaft PS may be formed in a shape of a shaft whose diameter is equal throughout its whole length as shown in the illustrated example, or formed in a shape of a stepped shaft.

The differential case DC is rotatably supported by the transmission case 1 with left and right bearings 2 interposed therebetween. Moreover, through-holes 1a through which to insert the output shafts A are formed in the transmission case 1. Annular seal members 3 for sealing interstices between inner peripheries of the through-holes 1a and outer peripheries of the output shafts A are interposed between the inner peripheries and the outer peripheries. Furthermore, an oil pan (not illustrated) facing an inner space of the transmission case 1 and reserving a predetermined amount of lubricant oil is provided in a bottom portion of the transmission case 1. Mechanical interlocking sections existing inside and outside the differential case DC can be lubricated with the lubricant oil which is scattered around the differential device D by rotation of the differential case DC and the other rotary members.

An input toothing portion Ig as a final driven gear is provided in an outer peripheral portion of the input member I. This input toothing portion Ig is in mesh with a drive gear (not illustrated) which is rotationally driven by power of the engine. Incidentally, in the embodiment, the input toothing portion Ig is directly formed in an outer peripheral surface of the input member I over a full lateral width of the input member I (i.e., an overall axial width of the input member I). Instead, however, the input toothing portion Ig may be formed to have the width smaller than that of the input member I. Otherwise, the input toothing portion Ig may be formed separately from the input member I, and thereafter fixed to the outer peripheral portion of the input member I.

Meanwhile, in the embodiment, the pinions P and the side gears S are each formed as a bevel gear. In addition, each pinion P as a whole and each side gear S as a whole, including their toothing portions, are formed by plastic working such as forging and the like. For these reasons, their toothing portions with an arbitrary gear ratio can be precisely formed without restriction in machining work in the case where the toothing portions of the pinions P and the side gears S are formed by cutting work. Incidentally, other types of gears may be used instead of the bevel gear. For example, a face gear may be used for the side gears S, while a spur gear or a helical gear may be used for the pinions P.

In addition, the pair of side gears S each include: a cylindrical shaft portion Sj to which an inner end portion of the corresponding one of the pair of output shafts A is connected by being spline-fitted as at 4; an annular toothing portion Sg situated at a position separated outward from the shaft portion Sj in a radial direction of the input member I, and being in mesh with the corresponding pinion P; and an intermediate wall portion Sw formed in a flat ring plate shape orthogonal to the axis L of the corresponding output shaft A, and integrally joining the shaft portion Sj and the toothing portion Sg.

The intermediate wall portion Sw is formed with its width t1 in the radial direction larger than a maximum diameter d1 of the pinion P, and with its maximum thickness t2 in an axial direction of the output shaft A smaller than an effective diameter d2 of the pinion shaft PS (see FIG. 1). Thereby, as described later, a diameter of the side gear S can be made large enough to set the number Z1 of teeth of the side gear S sufficiently larger than the number Z2 of teeth of the pinions P, and the side gear S can be sufficiently thinned in the axial direction of the output shaft A.

Moreover, the cover portion C, which is one of the pair of cover portions C, C', is formed separately from the input member I, and is detachably connected to the input member I using bolts b. The connecting method may use various connecting means other than screw means. Examples of the various connecting means include welding means and swaging means. Meanwhile, the other cover portion C' is formed integral with the input member I. Incidentally, like the one cover portion C, the other cover portion C' may be formed separately from the input member I, and connected to the input member I using bolts b or other connecting means.

Besides, each of the cover portions C, C' includes: a cylindrical boss portion Cb which concentrically surrounds the shaft portion Sj of the side gear S and in which the shaft portion Sj is rotatably fitted and supported; and a plate-shaped side wall portion Cs having an outer side surface which is a flat surface orthogonal to the rotation axis L of the input member I, the side wall portion Cs integrally connected to an inner end in an axial direction of the boss portion Cb. The side wall portions Cs of the cover portions C, C' are disposed within the width of the input member I (accordingly, the input toothing portion Ig) in the axial direction of the output shaft A. This inhibits the side wall portions Cs of the cover portions C, C' from protruding outward from an end surface of the input member I in the direction of the rotational axis, and is thus advantageous in making a width of the differential device D narrower in the axial direction of the output shaft.

In addition, by inner side surfaces of the side wall portions Cs of the cover portions C, C', back surfaces of at least one of the intermediate wall portions Sw and the toothing portions Sg of the side gears S are rotatably supported via washers W, respectively. Incidentally, such washers W may be omitted so that by the inner side surfaces of the side wall portions Cs, the back surfaces of at least one of the intermediate wall portions Sw and the toothing portions Sg of the side gears S are rotatably and directly supported, respectively. Furthermore, the shaft portions Sj of the side gears S may be supported by the boss portions Cb of the cover portions C, C' via bearings, respectively.

Meanwhile, the input member I surrounds an entire periphery of each side gear S with an inner peripheral surface Ii of the input member I being close to an outer peripheral portions of the side gear S. Furthermore, as also shown in FIG. 2, among the inner peripheral surface Ii of the input member I, particularly a predetermined inner peripheral part Iia situated around each pinion P is formed in a recessed shape so as to be separated farther from the rotation axis L of the input member I than the other inner peripheral parts, and thus forms an oil reservoir. For this reason, the oil reservoir can effectively collect and reserve the lubricant oil due to centrifugal force produced by rotation of the input member I, and a large amount of lubricant oil collected there can be efficiently supplied to the corresponding pinion P and its vicinity. Accordingly, even under severe driving conditions and the like, such as high-speed rotation of the pinions P, the lubricant oil can be sufficiently supplied to sliding portions of the pinions P and meshing portions of the pinions P and the side gears S. This is effective to prevent seizure in the sliding portions and the mesh portions.

In the differential device D of the embodiment in particular, as described above, the diameter of the side gears S (accordingly, the differential case DC) can be made large enough and the larger amount of lubricant oil can be efficiently collected into the predetermined inner peripheral parts Iia (the oil reservoirs) in the input member I using the larger centrifugal force. For this reason, even though the larger diameter of the side gears S makes the pinions P rotate at faster speed, an obvious seizure preventing effect can be obtained.

In the embodiment, the predetermined inner peripheral parts Iia serving as the oil reservoirs are each formed in a shape of an arc, whose curvature is larger than that of the other inner peripheral parts on a cross-section orthogonal to the rotation axis L of the input member I. In addition, in the embodiment (FIG. 2), the predetermined inner peripheral parts Iia are each formed as a first arc with a relatively small diameter, whose center O' is offset from the rotation axis L of the input member I toward the corresponding pinion P on the cross-section; and the other inner peripheral parts are each formed as a second arc with a diameter larger than that of the first arc, whose center O is situated on the rotation axis L of the input member I on the cross-section. Thereby, even when the predetermined inner peripheral parts Iia (the oil reservoirs) are set in relatively narrow areas in a peripheral direction, the predetermined inner peripheral parts Iia can be formed deeply enough on sides separating from the rotation axis L of the input member I. For this reason, the lubricant oil can be sufficiently retained there. Moreover, because the predetermined inner peripheral parts Iia can be easily machined in the inner peripheral surface Ii of the input member I even using a general-purpose machine such as a lathe and the like, cost reduction can be achieved.

Figure 3A:
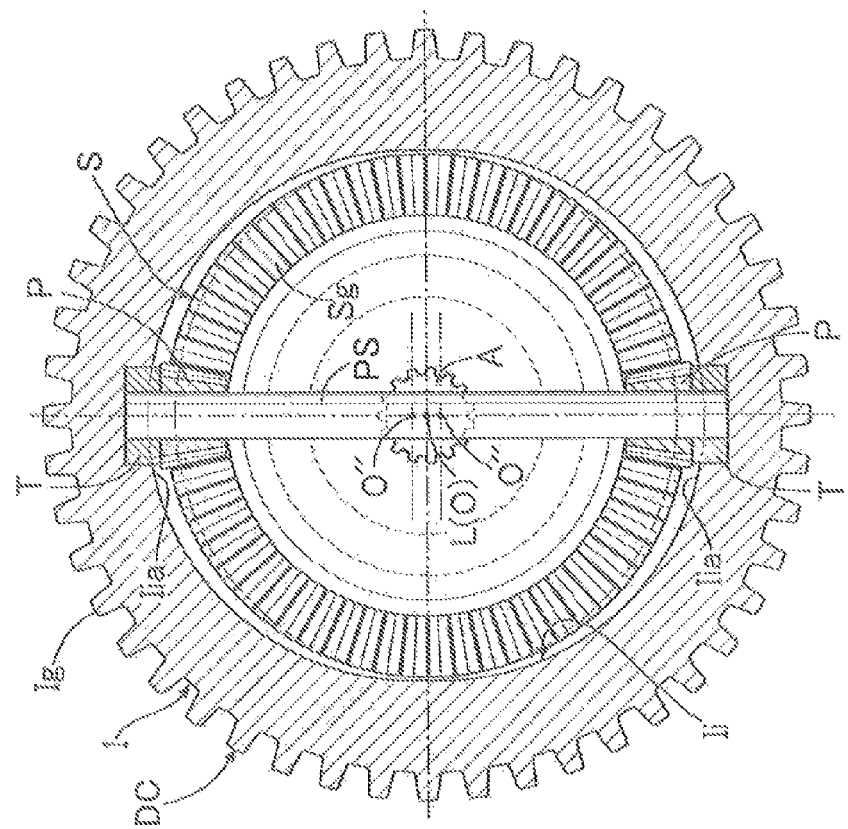
FIGS. 3A and 3B show modified embodiments of an input member of the differential device.
Figure 3B:
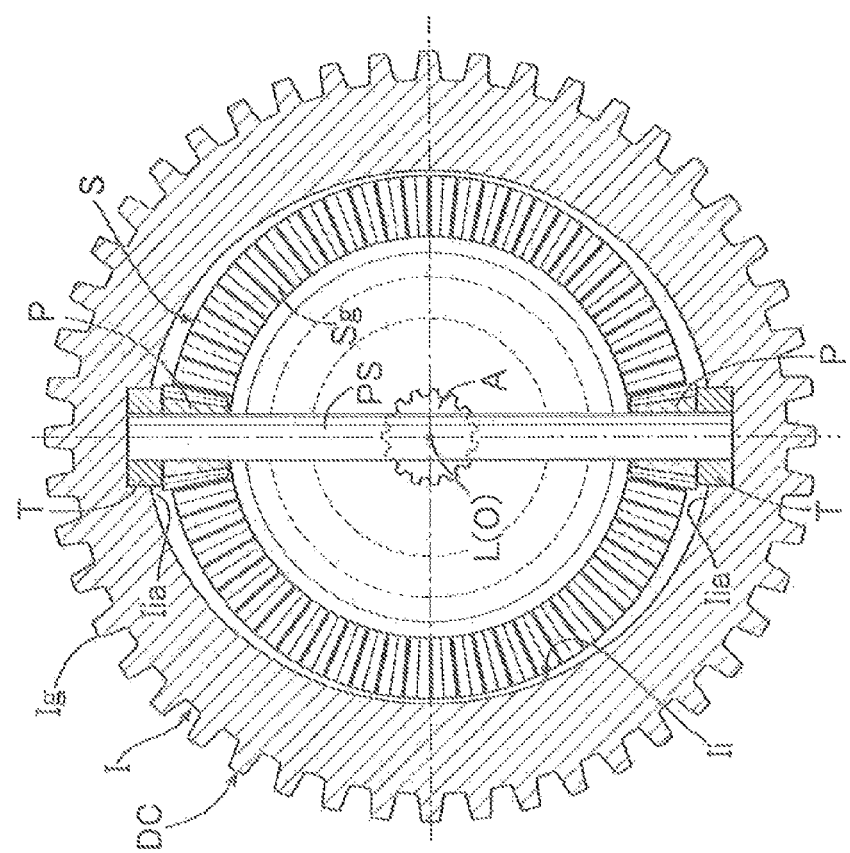

Meanwhile, FIGS. 3A and 3B show modified embodiments of the inner peripheral shape of the input member I. Specifically, in FIG. 3A, the inner peripheral surface Ii of the input member I is formed by joining multiple (two in the illustrated example) arcs with the same diameter whose centers O" are offset from the rotation axis L of the input member I toward the corresponding pinions P on the cross-section orthogonal to the rotation axis L of the input member I, while a central part of each arc in the peripheral direction serves as the predetermined inner peripheral part Iia. The inner peripheral shape of the input member I makes it possible to easily machine the predetermined inner peripheral parts Iia (the oil reservoirs) in the inner peripheral surface Ii of the input member I even using the general-purpose machine such as the lathe and the like. In addition, since the diameters of the multiple arcs are equal to one another, a machining tool such as a drill and the like for forming an arc surface can be used commonly for the arcs. For these reasons, further cost reduction can be achieved.

Moreover, in FIG. 3B, the inner peripheral surface Ii of the input member I is formed in a shape of an ellipse whose major axis coincides with an axis of the pinion shaft PS on the cross-section orthogonal to the rotation axis L of the input member I, while each end portion of the ellipse on the major axis side serves as the predetermined inner peripheral part Iia.

It should be noted that in addition to the embodiment shown in FIGS. 2, 3A and 3B, various modified embodiments can be created for the inner peripheral shape of the input member I. For example, on the cross-section, the inner peripheral shape of the input member I may be formed in an oval shape (not illustrated) which is formed by joining a pair of semicircles and a pair of short straight lines. In this case, a central part of each semicircle in the peripheral direction serves as the predetermined inner peripheral part Iia. Moreover, although in the embodiment, the predetermined inner peripheral parts Iia and the other inner peripheral parts are smoothly connected to each other, steps may be formed between the predetermined inner peripheral parts Iia and the other inner peripheral parts.

Next, descriptions will be provided for a structure for attaching the pinion shaft PS, as the pinion support portion, to the input member I. The pinion shaft PS has both end portions which are connected to and supported by the input member I via attachment bodies T. A retaining hole Th is formed in each attachment body T (see FIG. 1), the retaining hole Th being able to be fitted therein with and retain an entire periphery of the corresponding end portion of the pinion shaft PS. Furthermore, attachment grooves Ia each having a cross section with an angular U-shape are provided in the inner peripheral surface Ii of the input member I, each of the attachment grooves Ia having an opening in a side surface of the input member I on the one cover portion C side and extending in the axial direction of the output shafts A. Each attachment body T having a rectangular parallelepiped shape is inserted into the corresponding attachment groove Ia from the opening. The attachment body T is fixed to the input member I by fastening the one cover portion C to the input member I using the bolts b, with the attachment body T inserted in the attachment groove Ia of the input member I.

The above-described structure for attaching the pinion shaft PS to the input member I enables the pinion shaft PS to be easily and firmly connected and fixed to the attachment grooves Ia in the input member I by use of the block-shaped attachment bodies T in which the entire peripheries of the end portions of the pinion shaft PS are fitted and retained. For this reason, the pinion shaft PS can be connected to and supported by the input member I with high strength, with no specialized through-hole for supporting the pinion shaft PS formed in the input member I, and without decreasing assembly workability. Furthermore, the embodiment achieves structure simplification since the cover portion C covering the outer side of the corresponding side gear S concurrently serves as the fixing means for retaining the attachment body T.

Thereby, when the both end portions of the pinion shaft PS are connected to and supported by the input member I via the attachment bodies T, clearances 10 in the radial direction of the input member I are formed between outer end surfaces of the pinions P rotatably supported by the pinion shaft PS (i.e., end surfaces of the pinions P which are located outward in the radial direction of the input member I) and the inner peripheral surface Ii of the input member I (i.e., the predetermined inner peripheral parts Iia). This makes it easy for the lubricant oil to be reserved in the clearances 10, and is accordingly effective to prevent seizure in end portions of the pinions P facing the clearances 10, and their vicinities.

Meanwhile, the side wall portion Cs of the one cover portion C has a structure having oil retaining portions 7 covering parts of a back surface of the side gear S in first predetermined areas including areas which overlap the pinions P as seen in a side view from outside in the axial direction of the output shaft A (i.e., as seen in FIG. 2), and having lightening portions 8 exposing parts of the back surface of the side gear S to the outside of the differential case DC in second predetermined areas which do not overlap the pinions P as seen in the side view and connecting arm portions 9 being separated from the oil retaining portions 7 in the peripheral direction of the input member I and extending in the radial direction of the input member I to connect the boss portion Cb and the input member I. In other words, the side wall portion Cs basically having a disk shape in the cover portion C has a structural form in which: the multiple lightening portions 8 each having a cutout shape are formed in the side wall portion Cs at intervals in the peripheral direction; and thereby, one oil retaining portion 7 and one connecting arm portion 9 are formed respectively on opposite sides of the lightening portion 8 in the peripheral direction.

Furthermore, in the embodiment, the lightening portions 8 are each formed in a shape of a cutout which is opened on an outer peripheral end side of the side wall portion Cs and extends substantially along a direction orthogonal to the pinion shaft PS as seen in the side view. Thereby, the oil retaining portions 7 adjacent to the lightening portions 8 are formed as long in the peripheral direction as possible. This enhances an oil retaining effect to be exhibited by the oil retaining portions 7, which will be described next.

The structural form of the side wall portion Cs of the cover portion C, particularly the oil retaining portions 7, makes it possible for the lubricant oil, which tends to move outward in the radial direction due to the centrifugal force produced by the rotation of the input member I, to be easily retained around the pinions P and their vicinities. For this reason, in combination with the above-discussed oil concentrated reserving effect by the predetermined inner peripheral parts Iia (the oil reservoirs) of the input member I using the centrifugal force, it is possible to more efficiently supply the lubricant oil to the pinions P and their vicinities. Accordingly, even under severe driving conditions and the like, such as the high-speed rotation of the pinions P, the lubricant oil can be more efficiently supplied to the sliding portions of the pinions P, as well as the meshing portions of the pinions P and the side gears S; and the seizure in the sliding portions and the meshing portions can be prevented more effectively.

In addition, since the cover portion C includes the lightening portions 8, the lubricant oil can be distributed to the inside and outside of the differential case DC via the lightening portions 8. Thus, the lubricant oil is changed and cooled appropriately, thereby effectively preventing degradation of the lubricant oil. Furthermore, since a large amount of lubricant oil need not be confined inside the differential case DC, and since the cover portion C itself is reduced in weight by an amount of the forming of the lightening portions 8, reduction in the weight of the differential device D can be accordingly achieved.

It should be noted that although in the embodiment, the lightening portions 8 are each formed in the cutout shape which is opened on the outer peripheral end side of the side wall portion Cs, the lightening portions 8 may be instead each formed in a through-hole shape which is not opened on the outer peripheral end side thereof. Furthermore, it should be noted that although in the embodiment, the lightening portions 8 are formed only in the side wall portion Cs of the one cover portion C and the side wall portion Cs of the other cover portion C' is formed in a disk shape with no lightening portion (accordingly, covering entirely the back surfaces of the intermediate wall portion Sw and the toothing portion Sg of the corresponding side gear S), the lightening portions 8 may be formed in the side wall portion Cs of the other cover portion C' as well. In this case, the oil retaining portions 7 and the connecting arm portions 9 are integrally formed in the input member I.

Meanwhile, like the connecting arm portions 9, the oil retaining portions 7 of the embodiment each extend between, and connect, the boss portion Cb of the cover portion C and the input member I. In addition, connecting of the cover portion C to the input member I by the oil retaining portions 7 makes it easier for the lubricant oil, which tends to move outward in the radial direction due to the centrifugal force during the rotation of the input member I, to stay in spaces covered by the oil retaining portions 7 and the input member I. This makes it easy for the lubricant oil to be retained around the pinions P and their vicinities.

It should be noted that the structure for connecting the oil retaining portions 7 and the connecting arm portions 9 to the input member I has been described as the structure for connecting the cover portion C to the input member I. In other words, the oil retaining portions 7 and the connecting arm portions 9 may be formed integral with the input member I. Otherwise, in a case where the oil retaining portions 7 and the connecting arm portions 9 are formed separately from the input member I, the oil retaining portions 7 and the connecting arm portions 9 are connected to the input member I using the screw means such as the bolts b and the like, or other various connecting means (for example, welding means, swaging means and the like).

Furthermore, since the cover portion C has the structure in which the cover portion C integrally include the connecting arm portions 9 that connect the boss portion Cb and the input member I in addition to the oil retaining portions 7, the embodiment can accordingly increase: connecting strength with which the cover portion C is connected to the input member I; rigidity strength of the cover portion C itself which supports the back surface of the corresponding side gear S; and support rigidity with which the cover portion C supports the side gear S. Incidentally, the connecting arm portions 9 are not essential for the cover portion C, and another embodiment in which the connecting arm portions 9 are removed from the cover portion C may be carried out. Furthermore, in a case where the cover portion C particularly includes the connecting arm portions 9, another embodiment in which the oil retaining portions 7 are not connected to the input member I may be carried out.

Besides, the cover portion C of the embodiment has an oil guiding inclined surface f in a peripheral edge portion of each lightening portion 8, the oil guiding inclined surface f being capable of guiding flow of the lubricant oil into an inner side of the input member I during the rotation of the input member I. As seen in a cross-section crossing the oil retaining portions 7 and the connecting arm portions 9 in the peripheral direction of the input member I (see the partially cutaway sectional view in FIG. 2), the oil guiding inclined surface f is formed so as to be inclined to the respective center sides in the peripheral direction of the oil retaining portion 7 and the connecting arm portion 9, toward their respective inner side surfaces from their respective outer side surfaces. Thus, the oil guiding inclined surface f makes it possible for the lubricant oil to smoothly flow from the outer side to the inner side of the cover portion C, and accordingly enhances the effect of lubricating the pinions P and the like.

Figure 4:
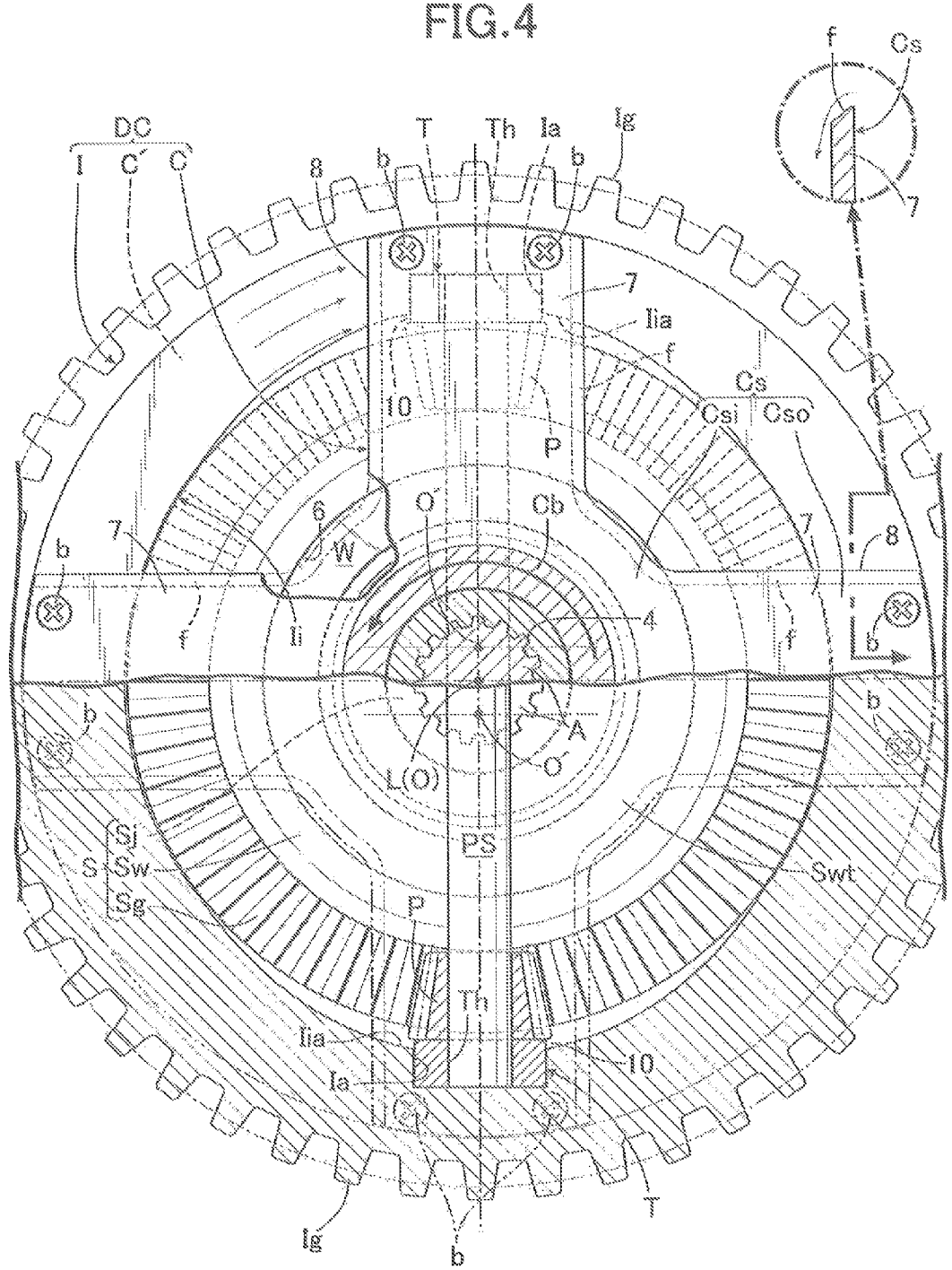
FIG. 4 is a side view showing a modified embodiment of a cover portion of the differential device, and corresponding to FIG. 2.

Moreover, various modified embodiments can be created for the form of the lightening portions 8 (accordingly, the oil retaining portions 7 and the connecting arm portions 9) of the cover portion C, and the form of the lightening portions 8 is not limited to the embodiment shown in FIG. 2. For example, in a modified embodiment shown in FIG. 4, each lightening portion 8 is formed in a shape of a fan whose center angle is substantially 90 degrees in a way that the oil retaining portions 7 and the connecting arm portions 9 extend radially (in other words, the oil retaining portions 7 and the connecting arm portions 9 have a cross shape as a whole).

Meanwhile, in each side gear S, at least part (in the embodiment, all) of the intermediate wall portion Sw is formed as a thin portion Swt whose outer side surface retreats inward from the back surface of the toothing portion Sg in the axial direction of the output shaft A (see FIG. 1). On the other hand, each of the side wall portions Cs of the cover portions C, C' (particularly, the oil retaining portions 7 and the connecting arm portions 9 in the side wall portion Cs of the cover portion C) integrally includes: an outer periphery-side side wall portion Cso whose inner side surface faces the back surface of the toothing portion Sg of the side gear S; and an inner periphery-side side wall portion Csi whose inner side surface faces the back surface of the intermediate wall portion Sw of the side gear S. Furthermore, at least part (in the embodiment, all) of the inner periphery-side side wall portion Csi is formed thicker in a direction along the rotation axis than the outer periphery-side side wall portion Cso, and protrudes toward the thin portion Swt.

Because of these structures, in each of the side gears S, at least part of the intermediate wall portion Sw, which does not need so much rigidity as the toothing portion Sg, can be formed as the thin portion Swt retreating inward in the axial direction from the back surface of the toothing portion Sg; in each of the cover portions C, C', each of the inner periphery-side side wall portions Csi of the cover portions C, C' corresponding to the thin portion Swt can be made thicker without being protruded outward in the axial direction; and the support rigidity with which the cover portion C supports the thin intermediate wall portion Sw of the side gear S can be sufficiently increased. This is extremely advantageous in sufficiently narrowing the width of the differential device D in the axial direction of the output shafts A while securing the rigidity strength of each side gear S and the differential case DC.

Moreover, as described above, the washers W relatively rotatably connecting the side gears S and the cover portions C, C' are interposed between mutually-facing surfaces of the back surfaces of the side gears S and the side wall portions Cs of the cover portions C, C', respectively. In the embodiment, washer retaining grooves 6 for retaining the washers W at their fixed positions are formed in back surfaces of the thin portions Swt of the side gears S, respectively. Thereby, the thin portions Swt with relatively low rigidity in the side gears S can be directly supported by the washers W, and support strength with respect to the thin portions Swt can be increased. Furthermore, since the washers W are housed in and retained by the washer retaining grooves 6, increase in the dimension of the differential device D in the axial direction due to the thicknesses of the washers W can be inhibited.

Figure 5A:
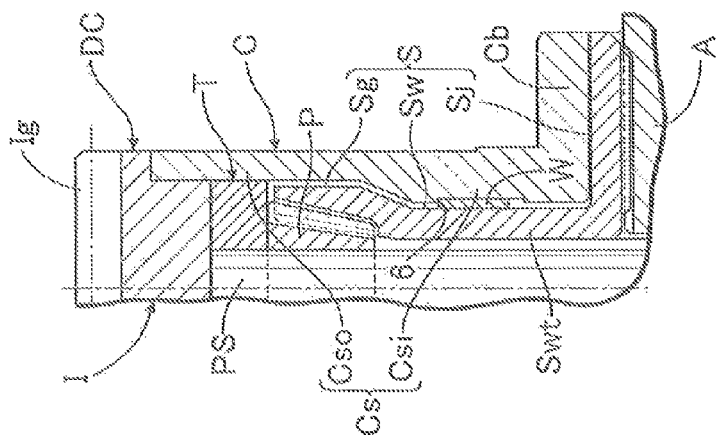
FIGS. 5A to 5D show other modified embodiments of the differential device.
Figure 5B:
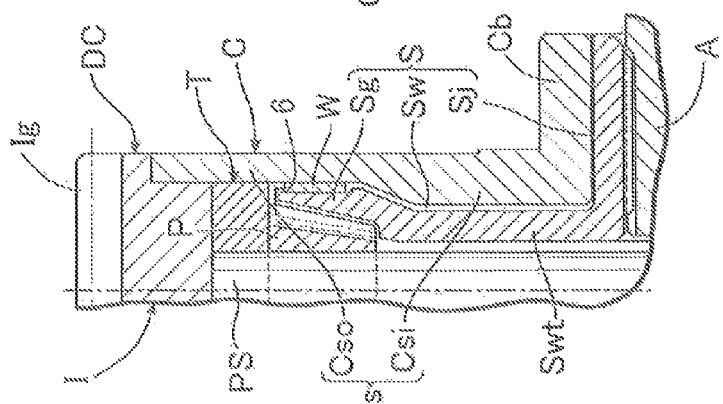

Meanwhile, various modified embodiments can be created for a mode of setting the washers W to be interposed between the mutually-facing surfaces of the back surfaces of the side gears S and the side wall portions Cs of the cover portions C, C'. For example, in FIG. 5A, the washer retaining groove 6 is formed in an inner side surface of each of the cover portions C, C' which faces the thin portion Swt of the corresponding side gear S, and the washer W is retained by the thus-formed washer retaining groove 6. This avoids that the thin portion Swt is further thinned due to the washer retaining groove 6. In addition, in FIG. 5B, the washer retaining groove 6 is formed in the back surface of the toothing portion Sg of the side gear S, and the washer W is retained by the thus-formed washer retaining groove 6. This shifts a load supporting point with respect to the side gear S further outward in the radial direction (accordingly, to a position close to a meshing portion of the side gear S and the pinion P), and thereby increases the supporting strength.

Figure 5C:
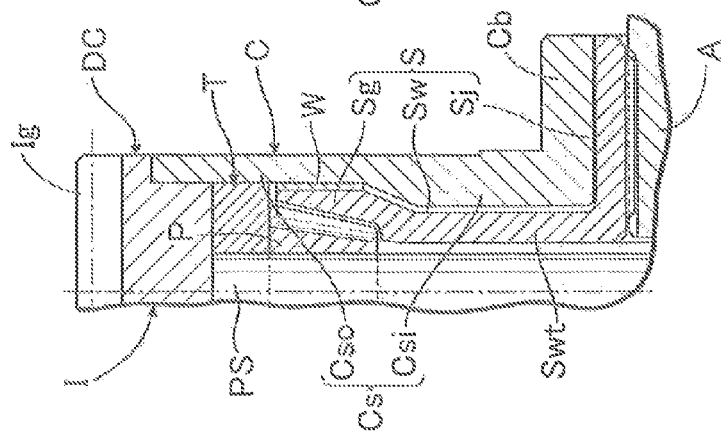

Furthermore, in FIG. 5C, a position of an inner periphery of the washer W is made to coincide with a start position at which the side wall portion Cs of each of the cover portions C, C' starts to protrude inward in the axial direction. Thereby, the mode of such inward protrusion of the side wall portion Cs is used to position the washer W. This makes it possible to position and retain the washer W even though no washer retaining groove 6 is provided, and decrease in the strength due to forming of the washer retaining groove is avoided.

Figure 5D:
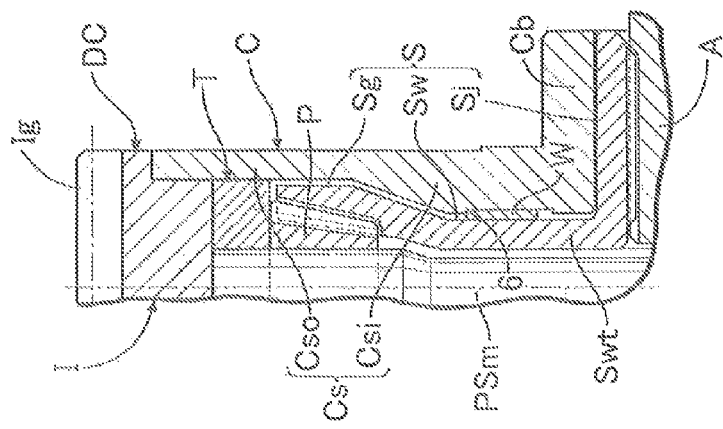

Moreover, in FIG. 5D, of the pinion shaft PS having a linear rod shape extending in the radial direction (along the one diameter line) from the rotation axis of the input member I, an intermediate shaft portion PSm facing the thin portion Swt of each side gear S is formed with a smaller diameter than that of another shaft portion of the pinion shaft PS. Thereby, the thin portion Swt is retreated and shifted inward in the axial direction by the decrease in the diameter of the intermediate shaft portion PSm like this, and the side wall portion Cs (particularly, the inner periphery-side side wall portion Csi) of each of the cover portions C, C' is made much thicker corresponding to such retreating shift so as to increase the support rigidity with respect to the corresponding side gear S.

Since as described above, each side gear S includes the intermediate wall portion Sw which is relatively wide in the radial direction, a torque transmission passage from the toothing portion Sg of side gear S to the corresponding output shaft A becomes longer in the radial direction so that the gear supporting strength may undesirably be decreased. In the embodiment, however, the washer W can be properly disposed and fixed at an appropriate radial position (see FIGS. 1 and 5A to 5D) considered the gear supporting strength along the torque transmission passage. For this reason, the embodiment can effectively inhibit the decrease in the gear supporting strength.

Next, descriptions will be provided for an operation of the embodiment. In the differential device D of the embodiment, in a case where the input member I receives rotational force from a power source, when together with the input member I, the pinion P revolves around the axis L of the input member I without rotating around the pinion shaft PS, the left and right side gears S are rotationally driven at the same speed, and their driving forces are evenly transmitted to the left and right output shafts A. Meanwhile, when a difference in rotational speed occurs between the left and right output shafts A due to turn traveling or the like of the automobile, the pinion P revolves around the axis L of the input member I while rotating around the pinion shaft PS. Thereby, the rotational driving force is transmitted from the pinion P to the left and right side gears S while allowing differential rotations. The above is the same as the operation of the conventional differential device.

Next, referring to FIGS. 6A to 6D, descriptions will be provided for steps of manufacturing and assembling the differential device D of the embodiment. The steps include at least steps [1] to [6] as follows.

[1] A step of manufacturing and preparing a differential case main body DC', the cover portion C, the side gears S, the pinions P, the pinion shaft PS, and the attachment bodies T, in their respective separate steps, the differential case main body DC' being obtained by integrally forming the input member I and the cover portion C' (or by connecting the input member I and the cover portion C' which are manufactured separately).

Figure 6A:
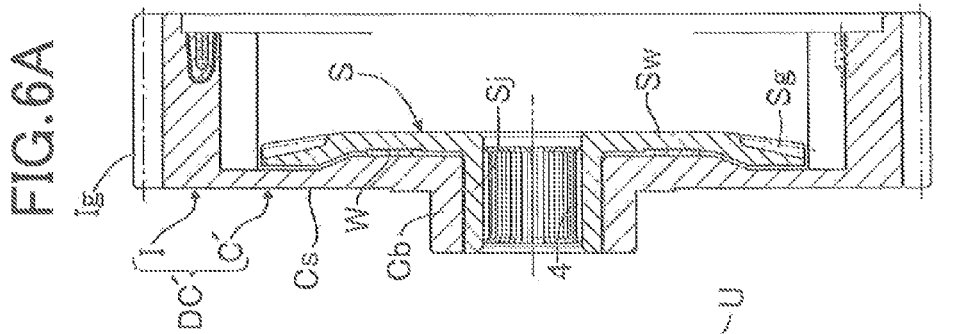
FIGS. 6A to 6D are step explanatory views showing an example of a step for assembling the differential device.

[2] A step of fitting one side gear S into the differential case main body DC' as shown in FIG. 6A.

Figure 6B:
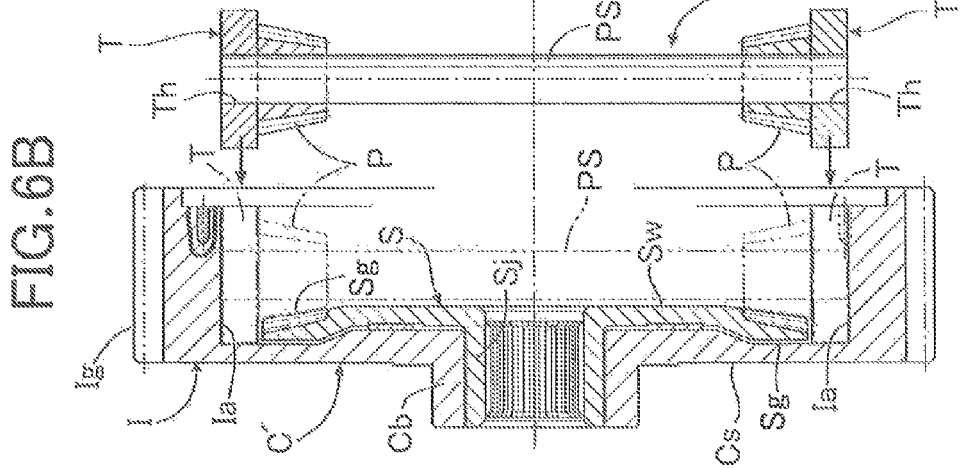

[3] An assembly step of, as shown by solid lines in FIG. 6B, assembling an attachment unit U such that the both end portions of the pinion shaft PS are fitted and supported in center holes of the pinions P and the retaining holes Th of the attachment bodies T, and temporarily keeping the assembled state using a jig (not illustrated).

[4] A step of, as shown by arrows and chain double-dashed lines in FIG. 6B, fitting the attachment unit U into the differential case main body DC' so as to insert the attachment bodies T into the attachment grooves Ia of the input member I and so as to mesh the pinions P with the toothing portion Sg of the one side gear S, thereby detaching the attachment unit U from the jig, and therefore temporarily fixing and retaining the attachment unit U to the input member I.

Figure 6C:
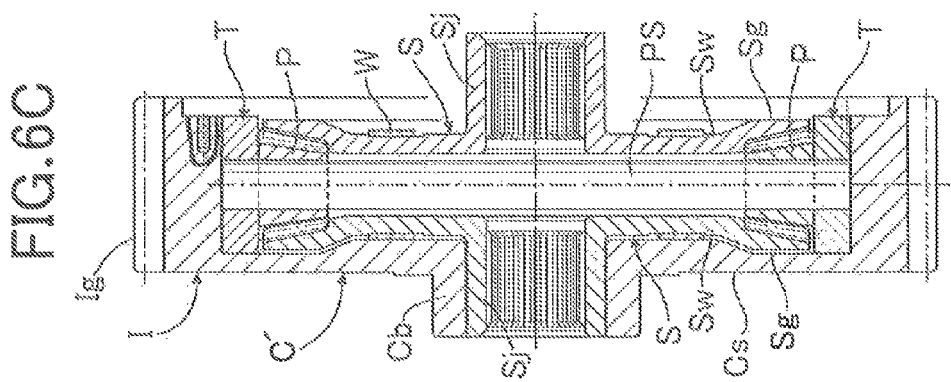

[5] A step of, as shown in FIG. 6C, overlapping the other side gear S on an outside of the attachment unit U temporarily fixed and retained to the input member I, and meshing the pinions P with the toothing portion Sg of the other side gear S.

Figure 6D:
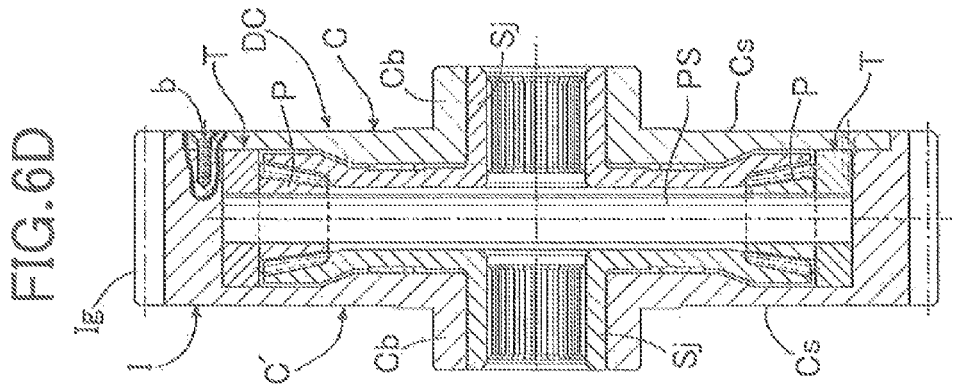

[6] A step of, as shown in FIG. 6D, overlapping the cover portion C on the back surface side of the other side gear S and fastening the cover portion C to the input member I with the bolts b, thereby clamping and fixing the attachment bodies T of the attachment unit U between the cover portion C and inner surfaces of the attachment grooves Ia of the input member I, thus completing the differential device D.

In the series of steps, particularly in the assembly step [3], the attachment unit U is assembled and fixed to the input member I by: assembling the attachment unit U as a subassembly in advance, the attachment unit U being obtained by unitizing the pinion shaft PS, the pinions P and the attachment bodies T; thereafter positioning and retaining the attachment unit U in the input member I by inserting the attachment bodies T into the attachment grooves Ia of the input member I; and thereafter fastening the cover portion C to the input member I. For this reason, assembly work efficiency can be effectively enhanced.

In addition, in the differential device D assembled as described above, each side gear S includes: the shaft portion Sj connected to the output shaft A; and the intermediate wall portion Sw formed in a flat ring plate shape orthogonal to the axis L of the output shaft A, and integrally connecting the shaft portion Sj and the side gear toothing portion Sg which is separated outward from the shaft portion Sj in the radial direction of the input member I. Furthermore, in each side gear S, the intermediate wall portion Sw is formed in the way that its width t1 in the radial direction is longer than a maximum diameter d1 of each pinion P. For these reasons, relative to the pinions P, the diameter of the side gear S can be made large enough to set the number Z1 of teeth of the side gear S sufficiently larger than the number Z2 of teeth of the pinions P. This makes it possible to reduce load burden to the pinion shaft PS while the torque is being transmitted from the pinions P to the side gears S, and thus to decrease the effective diameter d2 of the pinion shaft PS, accordingly the width of the pinions P in the axial direction of the output shafts A.

In addition, since the load burden to the pinion shaft PS is reduced as describe above, since reaction force applied to each side gear S decreases, and since the back surface of the intermediate wall portion Sw or the toothing portion Sg of the side gear S is supported by the corresponding cover side wall portion Cs, it is easy to secure the rigidity strength needed for the side gear S even though the intermediate wall portion Sw of the side gear S is thinned. That is to say, it is possible to sufficiently thin the side gear intermediate wall portion Sw while securing the support rigidity with respect to the side gear S. Moreover, in the embodiment, since the maximum thickness t2 of the side gear intermediate wall portion Sw is formed much smaller than the effective diameter d2 of the pinion shaft PS whose diameter can be made smaller as described above, the further thinning of the side gear intermediate wall portion Sw can be achieved. Besides, since the cover side wall portion Cs is formed in a plate shape such that the outer side surface thereof is the flat surface orthogonal to the axis L of the corresponding output shaft A, the thinning of the cover side wall portion Cs itself can be achieved.

As a result of these, the width of the differential device D can be sufficiently decreased in the axial direction of the output shafts A as a whole while securing as approximately the same strength (for example, static torsion load strength) and as approximately the same amount of maximum torque transmission compared with the conventional differential device. This makes it possible to easily incorporate the differential device D, with great freedom and without trouble, even when a transmission system imposes many restrictions on the layout of the vicinity of the differential device D, and is extremely advantageous in reducing the size of the transmission system.

In addition, in the embodiment, it is desirable that the side gears S and the pinions P be set to satisfy a relationship expressed with $$d3 \geq 3.74 \cdot d2 + 20 \tag{1}$$

where d2 denotes the effective diameter of the pinion support portion PS, and d3 denotes a load point length of the pinions P (i.e., in an area on and above a line X in FIG. 8A).

In this respect, the load point length d3 of the pinions P is twice as long as the length of the distance from the rotational axis L to a large-diameter end surface of one pinion P. For example, when the pair of pinions P are disposed facing each other, a distance between the large-diameter end surfaces of the pair of pinions P is the load point length d3 (see FIG. 1).

A line X1 shown in FIG. 8A represents a relationship between the pinion shaft diameter d2 and the load point length d3 of the pinions P in the conventional differential device. A predetermined static torsion load strength can be secured by setting the load point length d3 in a way that a relationship of the load point length d3 with the pinion shaft diameter d2 is represented by the line X1. In contrast, in a setting example in the embodiment, the line X whose gradient is equal to that of the line X1 and which makes the load point length d3 sufficiently large is set; and the pinion shaft diameter d2 and the load point length d3 of the pinions P are set in the region on and above the line X. For this reason, in the embodiment, the load point length of the pinions P can be made sufficiently long, and the width of the differential device D can be sufficiently decreased in the axial direction of the output shafts A, while securing the static torsion load strength which is not less than that of the conventional differential device.

Moreover, it is desirable that a pitch cone distance PCD of each pinion P as the bevel gear (i.e., a distance from a center of a fan shape of the pinion P having a longitudinal cross section with the fan shape to an outer end of the pinion P), the number Z2 of teeth of the pinion P, the number Z1 of teeth of each side gear S be set to satisfy relationships expressed with $$Z1/Z2 \geq 2 \tag{2}$$

$$PCD \geq 6.17 \cdot (Z1/Z2) + 20 \tag{3}$$

(i.e., in an area in the right of and on a line Y, and on and above a line Z in FIG. 8B). To put it specifically, the line Y in FIG. 8B represents a gear ratio (Z1/Z2) for sufficiently decreasing the width of the differential device D in the axial direction of the output shafts A. When the gear ratio (Z1/Z2) is set in the right of and on the line Y (i.e., when the gear ratio (Z1/Z2) is set at two or greater), the effect of decreasing the width of the differential device D is large as shown in FIG. 8C. Meanwhile, in FIG. 8B, the line Z is a line representing a relationship between the gear ratio and the pitch cone distance for obtaining an amount of torque transmission which is generally considered to be needed for four-wheeled automobiles, and is determined by plotting design values of the conventional differential device. Accordingly, when the relationship between the gear ratio (Z1/Z2) and the pitch cone distance of the pinion P is set in a way that the relationship is included in the area in the right of and on the line Y, and on and above the line Z, the width of the differential device D of the embodiment can be sufficiently decreased in the axial direction of the output shafts A (see FIG. 8C) while securing the amount of maximum torque transmission which is not less than that of the conventional differential device.

Figure 7:
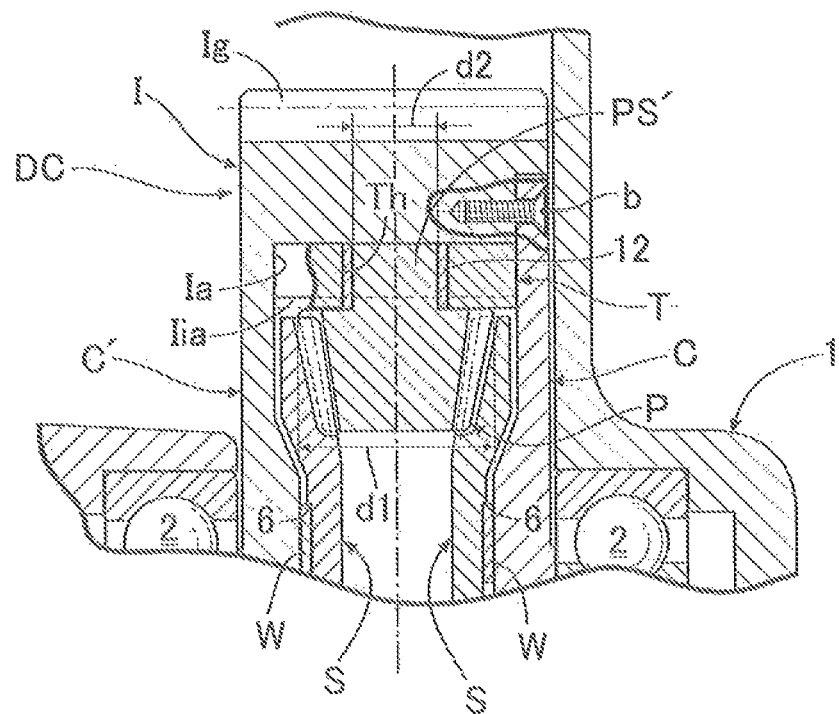
FIG. 7 is a partial sectional view showing a modified embodiment of a pinion support portion in the differential device, and corresponding to FIG. 1.

Meanwhile, although the embodiment where the long pinion shaft PS is used as the pinion support portion has been shown, the pinion support portion may be formed from a support shaft portion PS' coaxially and integrally connected to a large diameter-side end surface of the pinion P as shown in FIG. 7. According to this configuration, because the through-hole into which the pinion shaft PS is fitted need not be provided to the pinion P, the diameter of the pinion P can be accordingly decreased (the width thereof can be decreased in the axial direction), and the differential device D can be flattened in the axial direction of the output shafts A. In other words, when the pinion shaft PS is penetrated through the pinion P, it is necessary to form in the pinion P the through-hole with a size corresponding to the pinion shaft diameter. However, when the support shaft portion PS' is integrated with the end surface of the pinion P, it is possible to decrease the diameter of the pinion P (to decrease the width thereof in the axial direction) without depending on a diameter of the support shaft portion PS'.

Moreover, in the embodiment, a bearing bush 12 as a bearing for allowing relative rotations between the support shaft portion PS' and the attachment body T is inserted between an outer peripheral surface of the support shaft portion PS' and an inner peripheral surface of the retaining hole Th of the corresponding attachment body T into which the support shaft portion PS' is inserted. This bearing bush 12 is inserted between the inner periphery of the retaining hole Th of the attachment body T and the outer periphery of the support shaft portion PS' particularly in the assembly step [3]. This makes it possible to assemble the attachment unit U en masse, including the bearing bush 12, in the assembly step, and to therefore minimize the drop in the assembly work efficiency even though the number of parts increases in response to the addition of the bearing bush 12. Incidentally, the bearing may be formed from a needle bearing or the like. In addition, the bearing may be omitted so that the support shaft portion PS' is directly fitted into the retaining hole Th of the attachment body T.

Meanwhile, in the conventional differential devices exemplified in Japanese Patent No. 4803871 and Japanese Patent Application KOKAI Publication No. 2002-364728 which are described above, the number Z1 of teeth of the side gear (output gear) and the number Z2 of teeth of the pinion (differential gear) are generally set at 14 and 10, 16 and 10, or 13 and 9, respectively, as shown in Japanese Patent Application KOKAI Publication No. 2002-364728, for example. In these cases, the number-of-teeth ratios Z1/Z2 of the output gears to the differential gears are 1.4, 1.6 and 1.44, respectively. In addition, other publicly-known examples of the combination of the number Z1 of teeth and the number Z2 of teeth for conventional differential devices include 15 and 10, 17 and 10, 18 and 10, 19 and 10, and 20 and 10. In these cases, the number-of-teeth ratios Z1/Z2 are at 1.5, 1.7, 1.8, 1.9 and 2.0, respectively.

On the other hand, nowadays, there is an increase in the number of transmission systems which are under layout restrictions around their respective differential devices. Accordingly, the market demands that differential devices be sufficiently reduced in width (i.e., thinned) in the axial direction of their output shafts while securing the gear strength for the differential devices. However, the structural forms of the conventional existing differential devices are wide in the axial direction of the output shafts, as is clear from the gear combinations leading to the above-mentioned number-of-teeth ratios. This makes it difficult to satisfy the market demand.

With this taken into consideration, an attempt to find a concrete configuration example of the differential device D which can be sufficiently reduced in width (i.e., thinned) in the axial direction of the output shafts while securing the gear strength for the differential device has been made as follows, from a viewpoint different from that of the foregoing embodiment. Incidentally, the structures of the components of the differential device D of this configuration example are the same as the structures of the components of the differential device D of the foregoing embodiment which has been described using FIGS. 1 to 7. For this reason, the components of the configuration example will be denoted with the same reference signs as those of the embodiment, and descriptions for the structures will be omitted.

Figure 10:
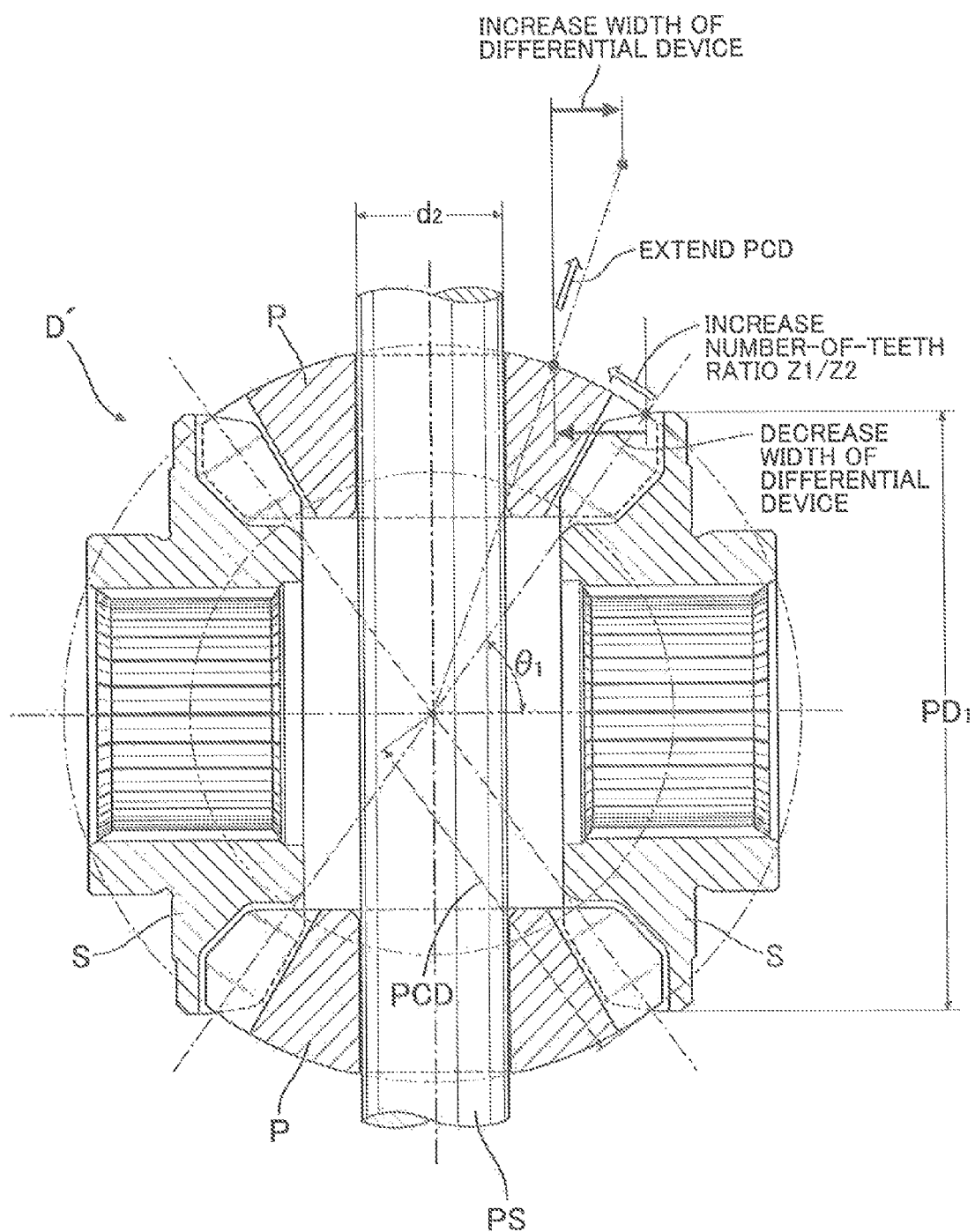
FIG. 10 is a longitudinal cross-sectional view showing an example of the conventional differential device.

To begin with, let us explain a basic concept for sufficiently reducing the width of (i.e., thinning) the differential device D in the axial direction of the output shafts A referring to FIG. 10 together. The concept is as follows.
Approach [1] To make the number-of-teeth ratio Z1/Z2 of the side gear S, that is, the output gear to the pinion P, that is, the differential gear larger than the number-of-teeth ratio used for the conventional existing differential device. (This leads to a decrease in the module (accordingly the tooth thickness) of the gear and a resultant decrease in the gear strength, while leading to an increase in the pitch circle diameter of the side gear S, a resultant decrease in transmission load in the meshing portion of the gear, and a resultant increase in the gear strength. However, the gear strength as a whole decreases, as discussed below.)
Approach [2] To make the pitch cone distance PCD of the pinion P larger than the pitch cone distance in the conventional existing differential device. (This leads to an increase in the module of the gear and a resultant increase in the gear strength, while leading to an increase in the pitch circle diameter of the side gear S, a resultant decrease in the transmission load in the meshing portion of the gear, and a resultant increase in the gear strength. Thus, the gear strength as a whole increases greatly, as discussed below.)

For these reasons, when the number-of-teeth ratio Z1/Z2 and the pitch cone distance PCD are set such that the amount of decrease in the gear strength based on Approach [1] is equal to the amount of increase in the gear strength based on Approach [2] or such that the amount of increase in the gear strength based on Approach [2] is greater than the amount of decrease in the gear strength based on Approach [1], the gear strength as a whole can be made equal to or greater than that of the conventional existing differential device.

Next, let us concretely examine how the gear strength changes based on Approaches [1] and [2] using mathematical expressions. Incidentally, the examination will be described in the following embodiment. First of all, a "reference differential device" is defined as a differential device D' in which the number Z1 of teeth of the side gear S is set at 14 while the number Z2 of teeth of the pinion P is set at 10. In addition, for each variable, a "change rate" is defined as a rate of change in the variable in comparison with the corresponding base number (i.e., 100%) of the reference differential device D'.
Approach [1]

When M, $PD_1$, $\theta_1$, PCD, F, and T respectively denote the module, pitch circle diameter, pitch angle, pitch cone distance, transmission load in the gear meshing portion, and transmission torque in the gear meshing portion, of the side gear S, general formulae concerning the bevel gear provide $M = PD_1/Z1$, $PD_1 = 2PCD \cdot sin\ \theta_1$, and $\theta_1 = tan^{-1}(Z1/Z2)$.

From these expressions, the module of the gear is expressed with $$M = 2PCD \cdot sin\ \{tan^{-1}(Z1/Z2)\}/Z1 \quad (1)$$

Meanwhile, the module of the reference differential device D' is expressed with $2PCD \cdot sin\ \{tan^{-1}(7/5)\}/14$.

Dividing the term on the right side of Expression (1) by $2PCD \cdot sin\ \{tan^{-1}(7/5)\}/14$ yields a module change rate with respect to the reference differential device D', which is expressed with Expression (2) given below.

$$\text{Module Change Rate} = \frac{14 \cdot sin\left(tan^{-1}\frac{Z1}{Z2}\right)}{Z1 \cdot sin\left(tan^{-1}\frac{7}{5}\right)} \quad (2)$$

In addition, the section modulus of the tooth portion corresponding to the gear strength (i.e., the bending strength of the tooth portion) is in proportion to the square of the tooth thickness, while the tooth thickness has a substantially linear relationship with the module M. For these reasons, the square of the module change rate corresponds to a rate of change in the section modulus of the tooth portion, accordingly a gear strength change rate. In other words, based on Expression (2) given above, the gear strength change rate is expressed with Expression (3) given below. Expression (3) is represented by a line L1 in FIG. 11 when the number Z2 of teeth of the Pinion is 10. From the line L1, it is learned that as the number-of-teeth ratio Z1/Z2 becomes larger, the module becomes smaller and the gear strength accordingly becomes lower.

$$\text{Gear Strength Change Rate} = (\text{Module Change Rate})^2 = \frac{196 \cdot \sin^2\left(\tan^{-1}\frac{Z1}{Z2}\right)}{Z1^2 \cdot \sin^2\left(\tan^{-1}\frac{7}{5}\right)} \quad (3)$$

Meanwhile, based on the general formulae concerning the bevel gear, a torque transmission distance of the side gear S is expressed with Expression (4) given below.

$$PD_1/2 = PCD \cdot \sin\{\tan^{-1}(Z1/Z2)\} \quad (4)$$

From the torque transmission distance $PD_1/2$, the transmission load F is given as $$F = 2T/PD_1.$$

For this reason, when the torque T of the side gear S of the reference differential device D' is constant, the transmission load F is in inverse proportion to the pitch circle diameter $PD_1$. In addition, the rate of change in the transmission load F is in inverse proportion to the gear strength change rate. For this reason, the gear strength change rate is equal to the rate of change in the pitch circle diameter $PD_1$.

As a result, using Expression (4), the rate of change in the pitch circle diameter $PD_1$ is expressed with Expression (5) given below.

$$\text{Gear Strength Change Rate} = PD_1 \text{ Change Rate} = \frac{\sin\left(\tan^{-1}\frac{Z1}{Z2}\right)}{\sin\left(\tan^{-1}\frac{7}{5}\right)} \quad (5)$$

Figure 11:
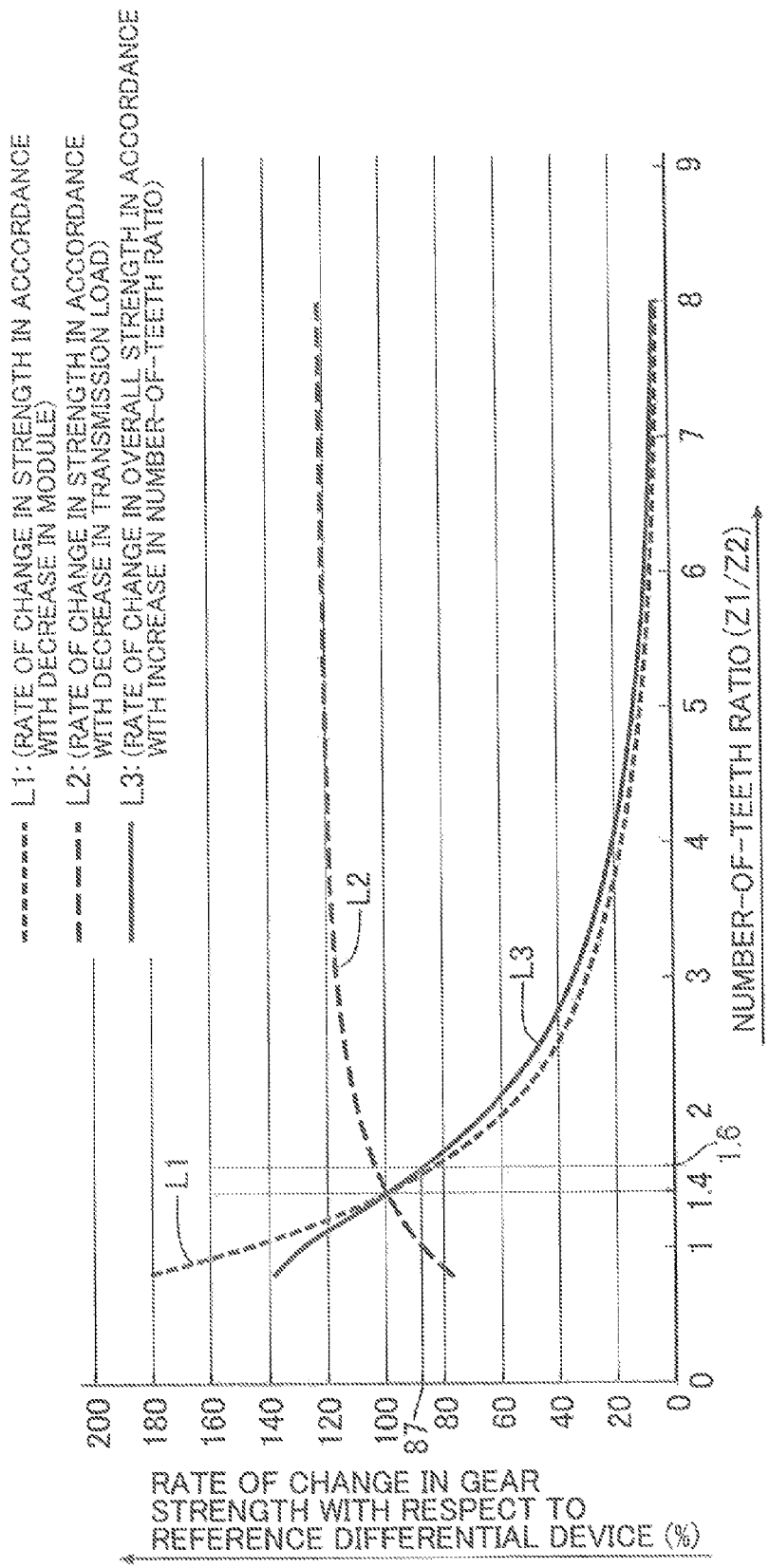
FIG. 11 is a graph showing a relationship of gear strength change rates with a number-of-teeth ratio where the number of teeth of the pinion is set at 10.

Expression (5) is represented by a line L2 in FIG. 11 when the number Z2 of teeth of the pinion P is 10. From the line L2, it is learned that as the number-of-teeth ratio Z1/Z2 becomes larger, the transmission load becomes smaller, and the gear strength accordingly becomes stronger.

Eventually, the gear strength change rate in accordance with the increase in the number-of-teeth ratio Z1/Z2 is expressed with Expression (6) given below by multiplying a rate of decrease change in the gear strength in accordance with the decrease in the module M (the term on the right side of Expression (3) shown above) and a rate of increase change in the gear strength in accordance with the decrease in the transmission load (the term on the right side of Expression (5) shown above).

$$\text{Gear Strength Change Rate in Accordance with Number-of-Teeth Ratio} = \frac{196 \cdot \sin^3\left(\tan^{-1}\frac{Z1}{Z2}\right)}{Z1^2 \cdot \sin^3\left(\tan^{-1}\frac{7}{5}\right)} \quad (6)$$

Expression (6) is represented by a line L3 in FIG. 11 when the number Z2 of teeth of the pinion P is 10. From the line L3, it is learned that as the number-of-teeth ratio Z1/Z2 becomes larger, the gear strength as a whole becomes lower.

Approach [2]

In a case of increasing the pitch cone distance PCD of the pinion P more than the pitch cone distance in the reference differential device D', when PCD1, PCD2 respectively denote the pitch cone distance PCD before the change and the pitch cone distance PCD after the change, the module change rate in accordance with the change in the pitch cone distance PCD is expressed with $$PCD2/PCD1$$

if the number of teeth is constant, based on the above-mentioned general formulae concerning the bevel gear.

Meanwhile, as being clear from the above-discussed process for deriving Expression (3), the gear strength change rate of the side gear S corresponds to the square of the module change rate. For this reason, $$\text{Gear Strength Change Rage in Accordance with Increase in Module} = (PCD2/PCD1)^2 \quad (7)$$

is obtained. Expression (7) is represented by a line L4 in FIG. 12. From the line L4, it is learned that as the pitch cone distance PCD becomes larger, the module becomes larger, and the gear strength accordingly becomes stronger.

In addition, when the pitch cone distance PCD is made larger than the pitch cone distance PCD1 in the reference differential device D', the transmission load F decreases. Thereby, the gear strength change rate becomes equal to the rate of change in the pitch circle diameter $PD_1$, as described above. In addition, the pitch circle diameter $PD_1$ of the side gear S is in proportion to the pitch cone distance PCD. For these reasons, $$\text{Gear Strength Change Rate in Accordance with Decrease in Transmission Load} = PCD2/PCD1 \quad (8)$$

is obtained.

Figure 12:
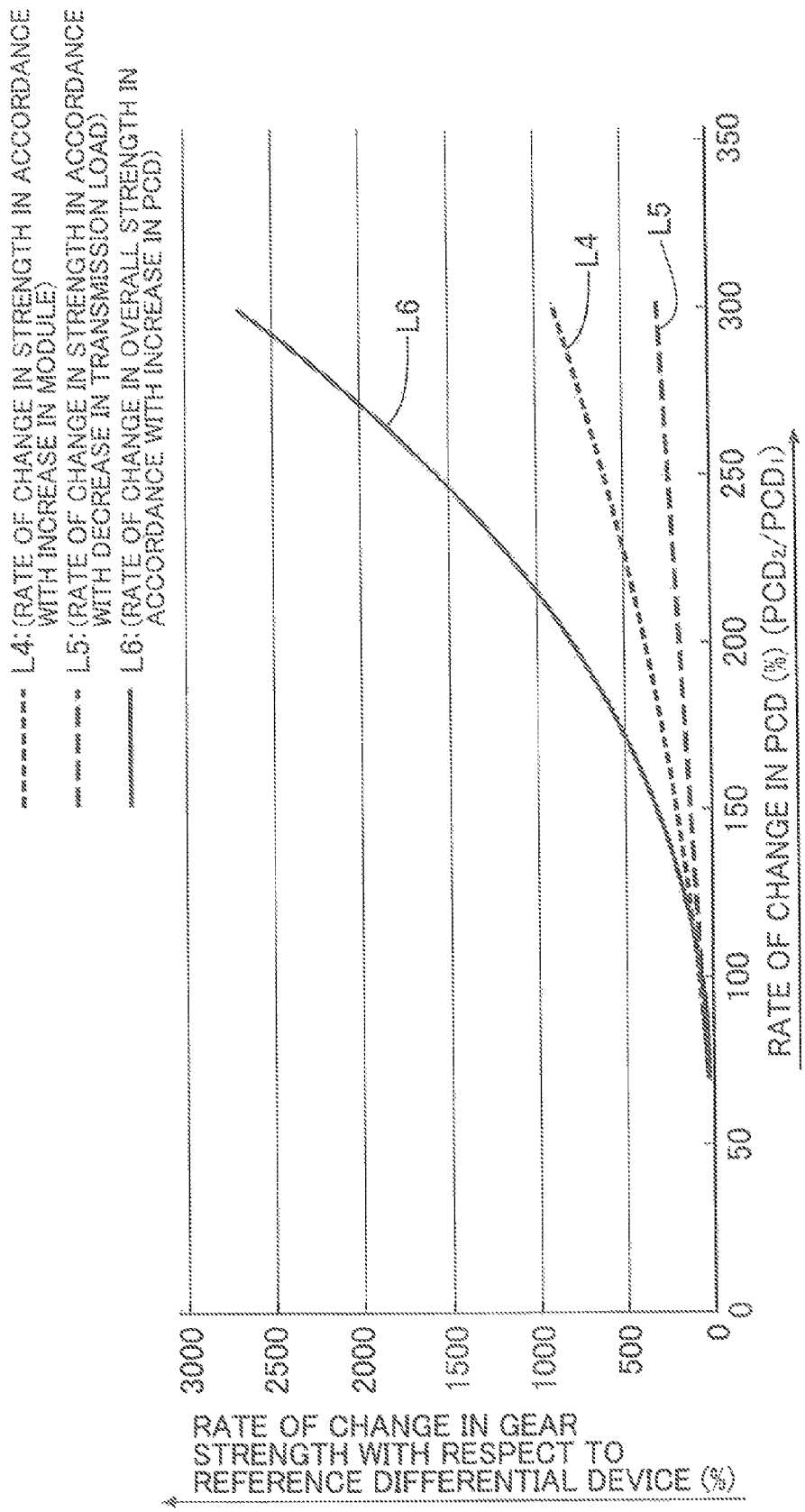
FIG. 12 is a graph showing a relationship of the gear strength change rates with a pitch cone distance change rate.

Expression (8) is represented by a line L5 in FIG. 12. From the line L5, it is learned that as the pitch cone distance PCD becomes larger, the transmission load becomes lower, and the gear strength accordingly becomes stronger.

In addition, the gear strength change rate in accordance with the increase in the pitch cone distance PCD is expressed with Expression (9) given below by multiplying the rate of increase change in the gear strength in accordance with the increase in the module M (the term on the right side of Expression (7) shown above) and the rate of increase change in the gear strength in accordance with the decrease in the transmission load in response to the increase in the pitch circle diameter PD (the term on the right side of Expression (8) shown above).

$$\text{Gear Strength Change Rate in Accordance with Increase in Pitch Cone Distance} = (PCD2/PCD1)^3 \quad (9)$$

Expression (9) is represented by a line L6 in FIG. 12. From the line 6, it is learned that as the pitch cone distance PCD becomes larger, the gear strength is increased greatly.

With these taken into consideration, the combination of the number-of-teeth ratio Z1/Z2 and the pitch cone distance PCD is determined such that: the decrease in the gear strength based on Approach [1] given above (the increase in the number-of-teeth ratio) is sufficiently compensated for by the increase in the gear strength based on Approach [2] given above (the increase in the pitch cone distance) so as to make the overall gear strength of the differential device equal to or greater than the gear strength of the conventional existing differential device.

For example, 100% of the gear strength of the side gear S of the reference differential device D' can be kept by setting the gear strength change rate in accordance with the increase in the number-of-teeth ratio (i.e., the term on the right side of Expression (6) given above) obtained based on Approach [1] given above and the gear strength change rate in accordance with the increase in the pitch cone distance (i.e., the term on the right side of Expression (9) given above) obtained based on Approach [2] given above, such that the multiplication of these gear strength change rates becomes equal to 100%. Thereby, the relationship between the number-of-teeth ratio Z1/Z2 and the rate of change in the pitch cone distance PCD for keeping 100% of the gear strength of the reference differential device D' can be obtained from Expression (10) given below. Expression (10) is represented by a line L7 in FIG. 13 when the number Z2 of teeth of the pinion P is 10.

$$PCD2/PCD1 = \left(100\% \middle/ \begin{array}{c} \text{Gear Strength Change} \\ \text{Rate in Accordance with} \\ \text{Number-of-Teeth Ratio} \end{array}\right)^{\frac{1}{3}} \quad (10)$$

$$= \left\{ \frac{1}{\frac{196 \cdot \sin^3\left(\tan^{-1}\frac{Z1}{Z2}\right)}{Z1^2 \cdot \sin^3\left(\tan^{-1}\frac{7}{5}\right)}} \right\}^{\frac{1}{3}}$$

$$= \left(\frac{Z1}{14}\right)^{\frac{2}{3}} \cdot \frac{\sin\left(\tan^{-1}\frac{7}{5}\right)}{\sin\left(\tan^{-1}\frac{Z1}{Z2}\right)}$$

Figure 13:
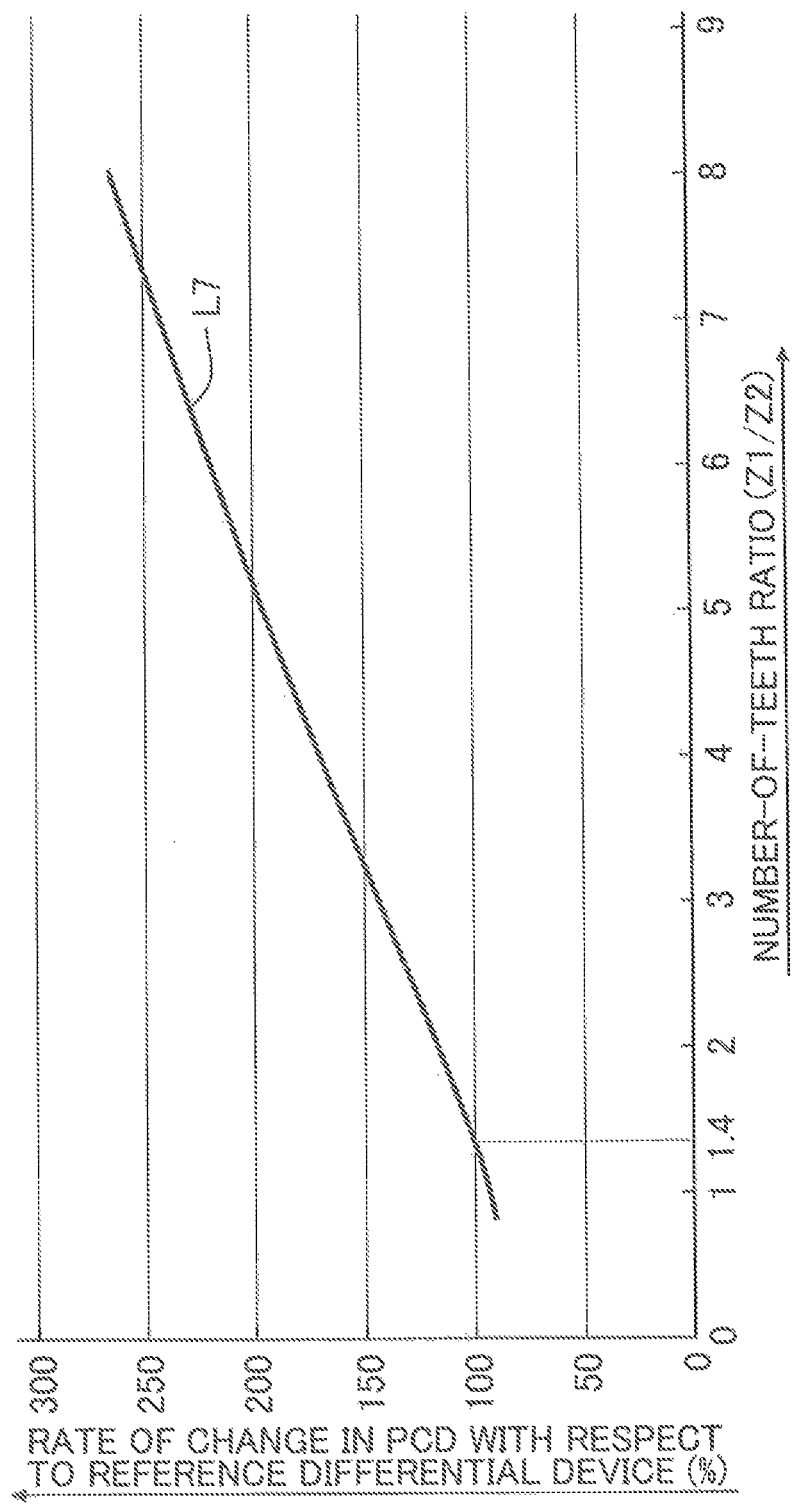
FIG. 13 is a graph showing a relationship of the pitch cone distance change rate with the number-of-teeth ratio for keeping 100% of the gear strength where the number of teeth of the pinion is set at 10.

Like this, Expression (10) represents the relationship between the number-of-teeth ratio Z1/Z2 and the rate of change in the pitch cone distance PCD for keeping 100% of the gear strength of the reference differential device D' when the number-of-teeth ratio Z1/Z2 is equal to 14/10 (see FIG. 13). The rate of change in the pitch cone distance PCD represented by the vertical axis in FIG. 13 can be converted into a ratio of d2/PCD where d2 denotes a shaft diameter of the pinion shaft PS (i.e., the differential gear support portion) supporting the pinion P.

TABLE 1

| PCD | SHAFT DIAMETER (d2) | d2/PCD |
|---|---|---|
| 31 | 13 | 42% |
| 35 | 15 | 43% |
| 38 | 17 | 45% |
| 39 | 17 | 44% |
| 41 | 18 | 44% |
| 45 | 18 | 40% |

To put it concretely, in the conventional existing differential device, the increase change in the pitch cone distance PCD correlates with the increase change in the shaft diameter d2 as shown in Table 1, and can be represented by a decrease in the ratio of d2 /PCD when d2 is constant. In addition, in the conventional existing differential device, d2/PCD falls within a range of 40% to 45% as shown in Table 1 given above when the conventional existing differential device is the reference differential device D', and the gear strength increases as the pitch cone distance PCD increases. Judging from these, the gear strength of the differential device can be made equal to or greater than the gear strength of the conventional existing differential device by determining the shaft diameter d2 of the pinion shaft PS and the pitch cone distance PCD such that at least d2/PCD is equal to or less than 45%, when the differential device is the reference differential device D'. In other words, when the differential device is the reference differential device D', it suffices if d2/PCD≤0.45 is satisfied. In this case, when PCD2 denotes the pitch cone distance PCD which is changed to become larger or less than the pitch cone distance PCD1 of the reference differential device D', it suffices if $$d2/PCD2 \leq 0.45/(PCD2/PCD1) \quad (11)$$

is satisfied. Furthermore, the application of Expression (11) to Expression (10) given above can convert the relationship between d2/PCD and the number-of-teeth ratio Z1/Z2 into Expression (12) given below.

$$d2/PCD \leq 0.45/(PCD2/PCD1) \quad (12)$$

$$= 0.45 \middle/ \left\{ \left(\frac{Z1}{14}\right)^{\frac{2}{3}} \cdot \frac{\sin\left(\tan^{-1}\frac{7}{5}\right)}{\sin\left(\tan^{-1}\frac{Z1}{Z2}\right)} \right\}$$

$$= 0.45 \cdot \left(\frac{14}{Z1}\right)^{\frac{2}{3}} \cdot \frac{\sin\left(\tan^{-1}\frac{Z1}{Z2}\right)}{\sin\left(\tan^{-1}\frac{7}{5}\right)}$$

Figure 14:
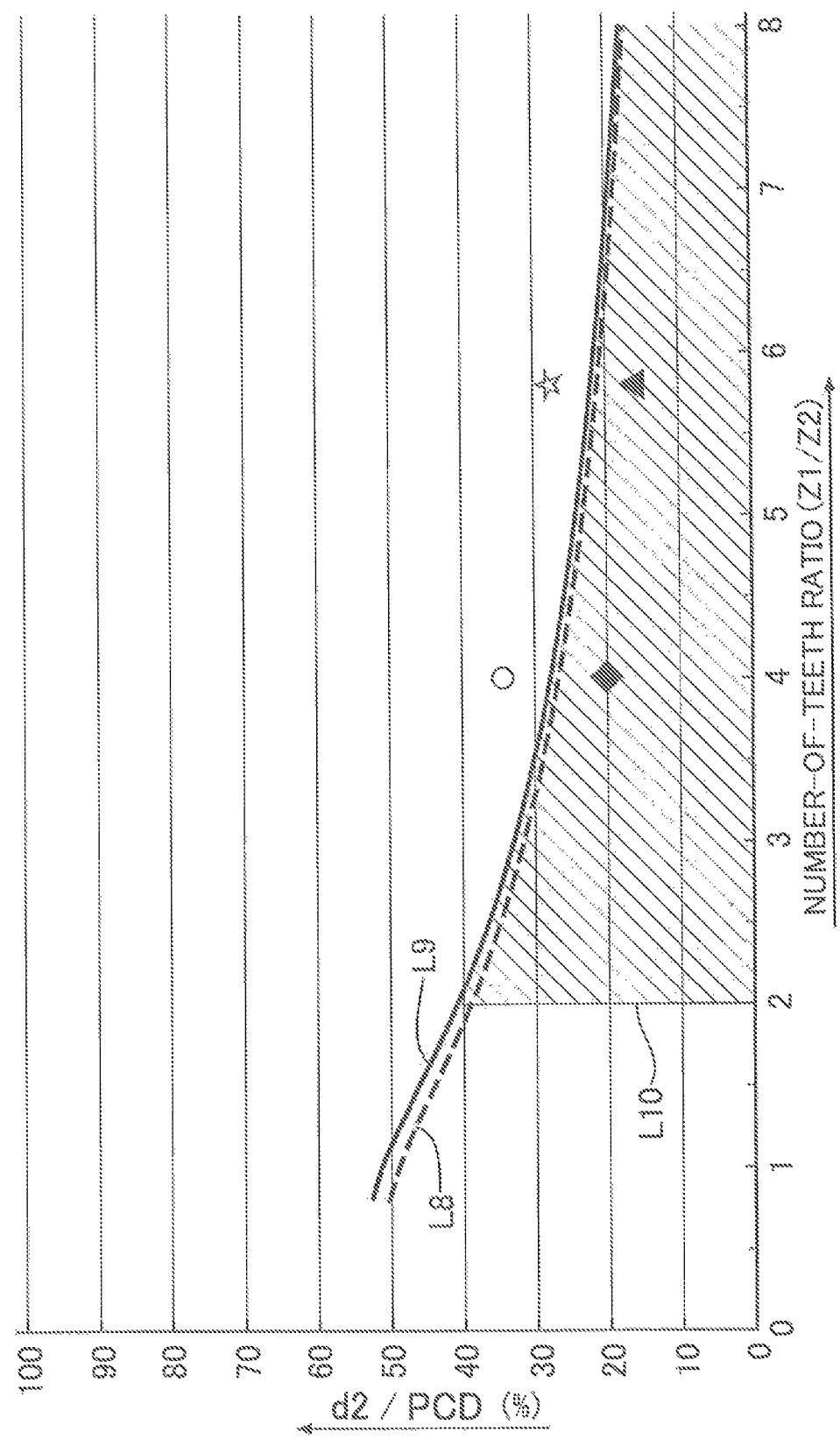
FIG. 14 is a graph showing a relationship between a shaft diameter/pitch cone distance ratio and the number-of-teeth ratio where the number of teeth of the pinion is set at 10.

When the Expression (12) is equal, Expression (12) can be represented by a line L8 in FIG. 14 if the number Z2 of teeth of the pinion P is 10. When the Expression (12) is equal, the relationship between d2/PCD and the number-of-teeth ratio Z1/Z2 keeps 100% of the gear strength of the reference differential device D'.

Meanwhile, in conventional existing differential devices, usually, not only the number-of-teeth ratio Z1/Z2 equal to 1.4 used above to explain the reference differential device D' but also the number-of-teeth ratio Z1/Z2 equal to 1.6 or 1.44 is adopted. This needs to be taken into consideration. Based on the assumption that the reference differential device D' (Z1/Z2=1.4) guarantee the necessary and sufficient gear strength, that is, 100% of gear strength, it is learned, as being clear from FIG. 11, that the gear strength of conventional existing differential devices in which the number-of-teeth ratio Z1/Z2 is 16/10 is as low as 87% of the gear strength of the reference differential device D'. The general practice, however, is that the gear strength low at that level is accepted as practical strength and actually used for conventional existing differential devices. Judging from this, one may consider that gear strength which needs to be sufficiently secured for and is acceptable for the differential device which is thinned in the axial direction is at least equal to, or greater than, 87% of the gear strength of the reference differential device D'.

From the above viewpoint, first, a relationship for keeping 87% of the gear strength of the reference differential device D' is obtained between the number-of-teeth ratio Z1/Z2 and the rate of change in the pitch cone distance PCD. The relationship can be expressed with Expression (10') given below by performing a calculation by emulating the process of deriving Expression (10) given above (i.e., a calculation such that the multiplication of the gear strength change rate in accordance with the increase in the number-of-teeth ratio (i.e., the term on the right side of Expression (6) given above) and the gear strength change rate in accordance with the increase in the pitch cone distance (i.e., the term on the right side of Expression (9) given above) becomes equal to 87%).

$$PCD2/PCD1 = \left(87\% \middle/ \begin{array}{c}\text{Gear Strength Change} \\ \text{Rate in Accordance with} \\ \text{Number-of-Teeth Ratio}\end{array}\right)^{\frac{1}{3}} \quad (10')$$

$$= \left\{\frac{0.87}{\frac{196 \cdot \sin^3\left(\tan^{-1}\frac{Z1}{Z2}\right)}{Z1^2 \cdot \sin^3\left(\tan^{-1}\frac{7}{5}\right)}}\right\}^{\frac{1}{3}}$$

$$= 0.87^{\frac{1}{3}} \cdot \left(\frac{Z1}{14}\right)^{\frac{2}{3}} \cdot \frac{\sin\left(\tan^{-1}\frac{7}{5}\right)}{\sin\left(\tan^{-1}\frac{Z1}{Z2}\right)}$$

Thereafter, when Expression (11) given above is applied to Expression (10') given above, the relationship between d2/PCD and the number-of-teeth ratio Z1/Z2 for keeping 87% or more of the gear strength of the reference differential device D' can be converted into Expression (13) given below. However, the calculation is performed using the following rules that: the number of significant figures is three for all the factors, except for factors expressed with variables; digits below the third significant figure are rounded down; and although the result of the calculation cannot avoid approximation by an calculation error, the mathematical expression uses the equals sign because the error is negligible.

$$d2/PCD \leq 0.45 \middle/ \left\{0.87^{\frac{1}{3}} \cdot \left(\frac{Z1}{14}\right)^{\frac{2}{3}} \cdot \frac{\sin\left(\tan^{-1}\frac{7}{5}\right)}{\sin\left(\tan^{-1}\frac{Z1}{Z2}\right)}\right\} \quad (13)$$

$$= 3.36 \cdot \left(\frac{1}{Z1}\right)^{\frac{2}{3}} \cdot \sin\left(\tan^{-1}\frac{Z1}{Z2}\right)$$

When the Expression (13) is equal, Expression (13) can be represented by FIG. 14 (more specifically, by a line L9 in FIG. 14) if the number Z2 of teeth of the pinion P is 10. In this case, an area corresponding to Expression (13) is an area on and under the line L9 in FIG. 14. In addition, a specific area (a hatched area in FIG. 14) satisfying Expression (13) and located on the right side of a line L10 in FIG. 14 where the number-of-teeth ratio Z1/Z2 >2.0 is satisfied is an area for setting Z1/Z2 and d2/PCD which enable at least 87% or more of the gear strength of the reference differential device D' to be secured particularly for the differential device thinned in the axial direction where the number Z2 of teeth of the pinion P is 10 and the number-of-teeth ratio Z1/Z2 is greater than 2.0. For reference, a black diamond in FIG. 14 represents an example where the number-of-teeth ratio Z1/Z2 and d2/PCD are set at 40/10 and 20.00%, respectively, and a black triangle in FIG. 14 represents an example where the number-of-teeth ratio Z1/Z2 and d2/PCD are set at 58/10 and 16.67%, respectively. These examples fall within the specific area. A result of a simulation for strength analysis on these examples has confirmed that the gear strength equal to or greater than those of the conventional differential devices (more specifically, the gear strength equal to or greater than 87% of the gear strength of the reference differential device D') were obtained.

Thus, the thinned differential device falling within the specific area is configured as the differential device which, as a whole, is sufficiently reduced in width in the axial direction of the output shafts while securing the gear strength (for example, static torsion load strength) and the maximum amount of torque transmission at approximately the same levels as the conventional existing differential devices which are not thinned in the axial direction thereof. Accordingly, it is possible to achieve effects of: being capable of easily incorporating the differential device in a transmission system, which is under many layout restrictions around the differential device, with great freedom and no specific difficulties; being extremely advantageous in reducing the size of the transmission system; and the like.

Figure 15:
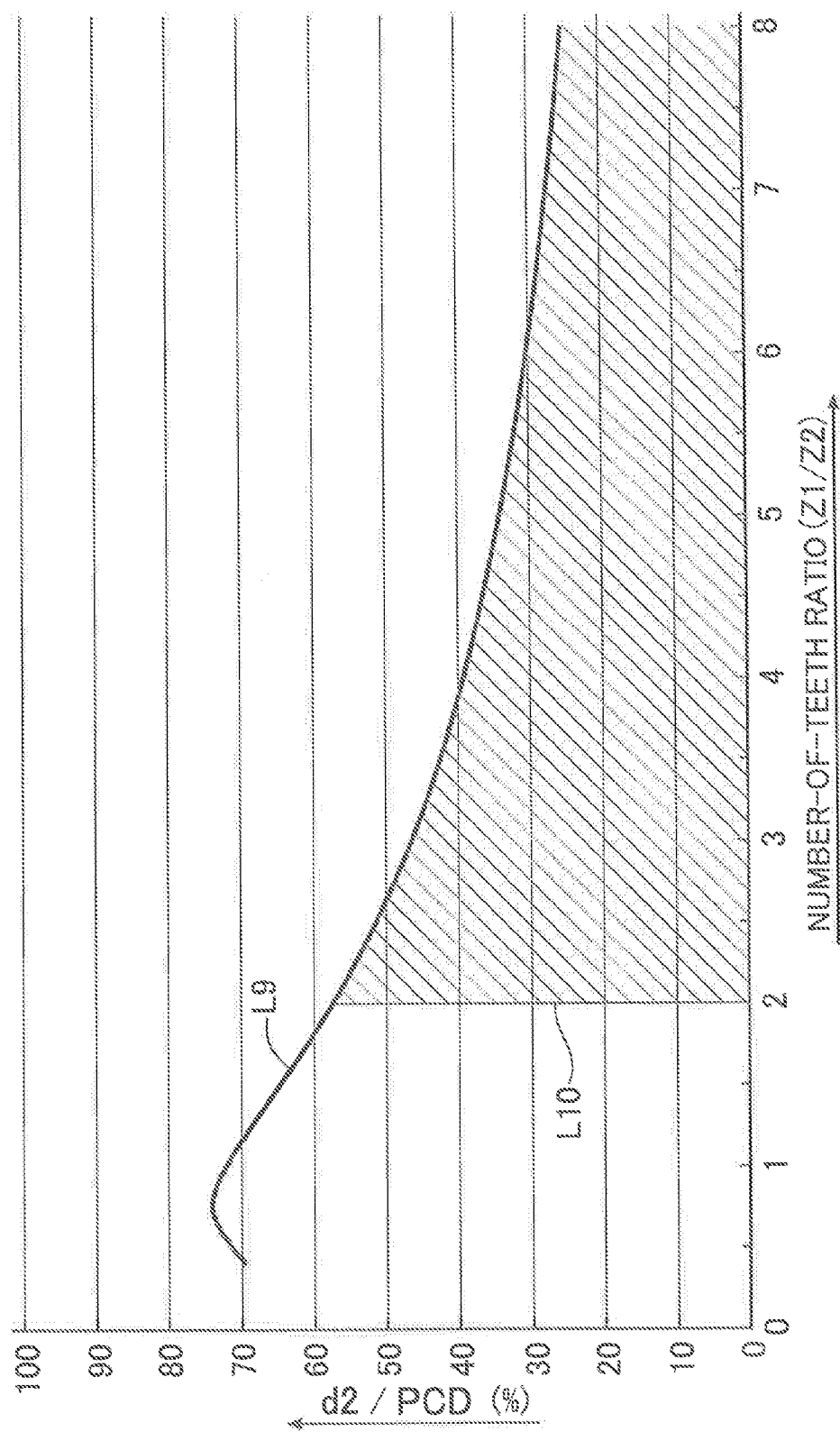
FIG. 15 is a graph showing a relationship between the shaft diameter/pitch cone distance ratio and the number-of-teeth ratio where the number of teeth of the pinion is set at 6.

It should be noted that although the foregoing descriptions (the descriptions in connection with FIGS. 11, 13, 14 in particular) have been provided for the differential device in which the number Z2 of teeth of the pinion P is set at 10, the present invention is not limited to this. For example, when the number Z2 of teeth of the pinion P is set at 6, 12 and 20, too, the thinned differential device capable of achieving the above effects can be represented by Expression (13), as shown by hatched areas in FIGS. 15, 16 and 17. In other words, Expression (13) derived in the above-described manner is applicable regardless of the change in the number Z2 of teeth of the pinion P. For example, even when the number Z2 of teeth of the pinion P is set at 6, 12 and 20, the above effects can be obtained by setting the number Z1 of teeth of the side gear S, the number Z2 of teeth of the pinion P, the shaft diameter d2 of the pinion shaft PS and the pitch cone distance PCD such that Expression (13) is satisfied, like in the case where the number Z2 of teeth of the pinion P is set at 10.

Figure 16:
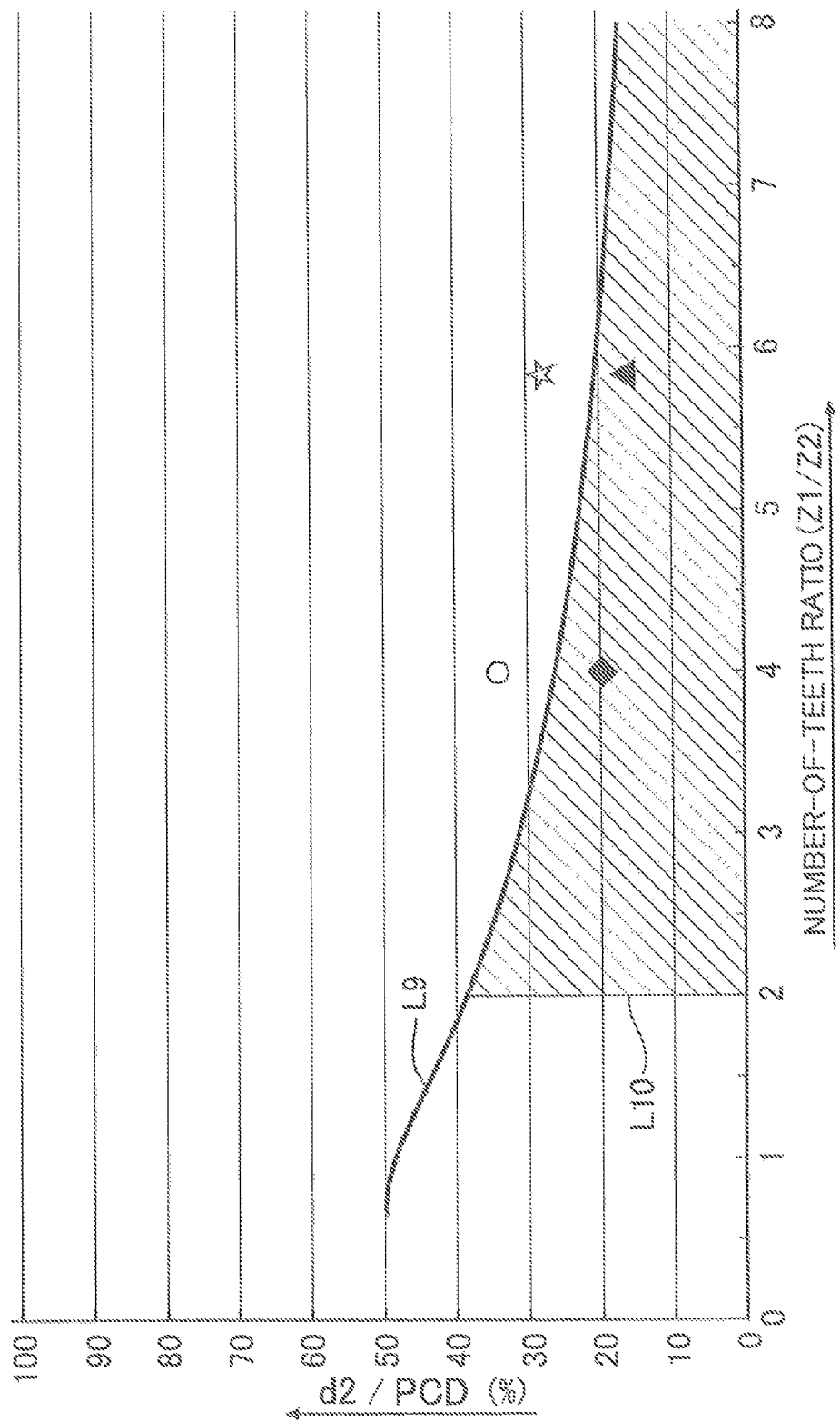
FIG. 16 is a graph showing a relationship between the shaft diameter/pitch cone distance ratio and the number-of-teeth ratio where the number of teeth of the pinion is set at 12.
Figure 17:
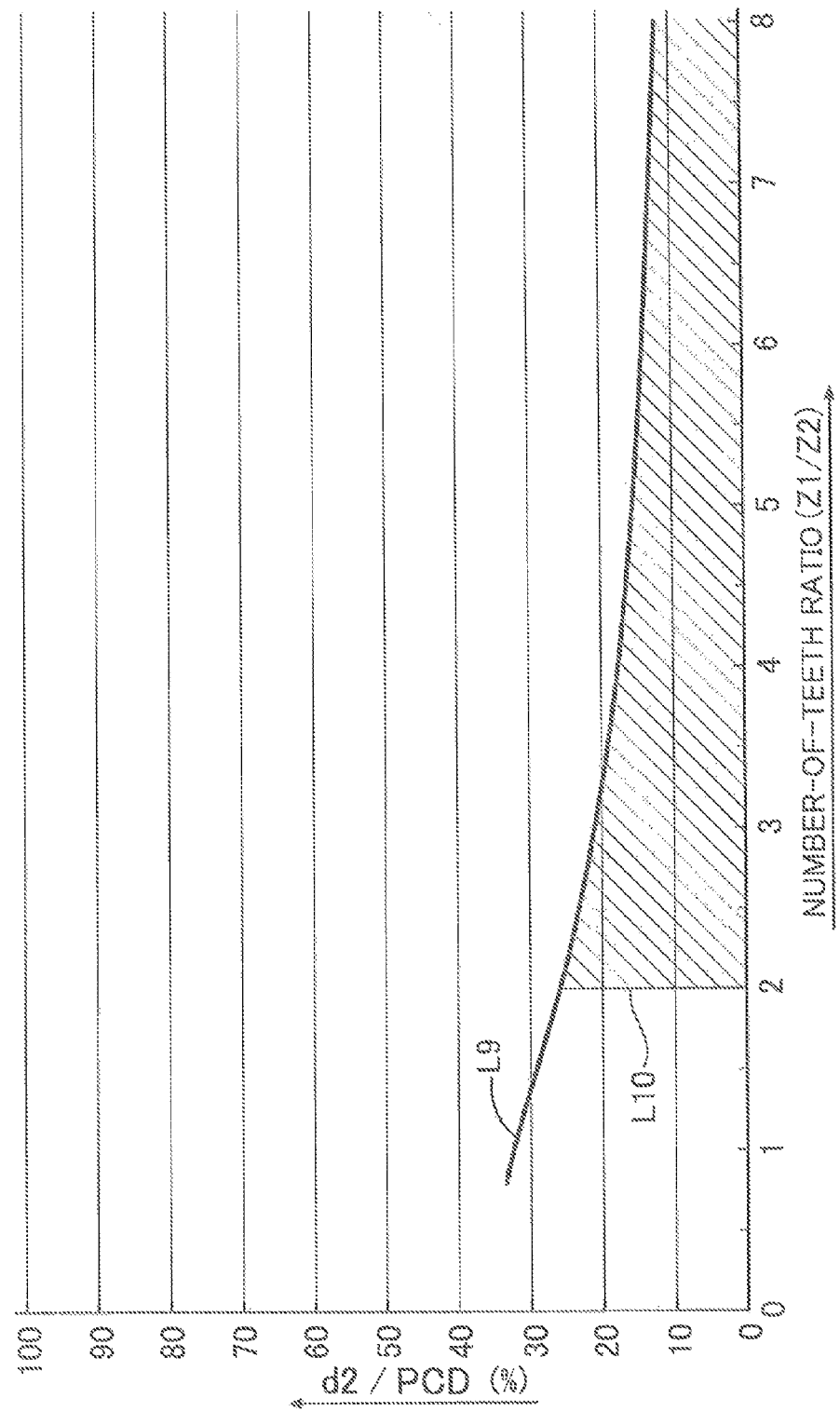
FIG. 17 is a graph showing a relationship between the shaft diameter/pitch cone distance ratio and the number-of-teeth ratio where the number of teeth of the pinion is set at 20.

Furthermore, for reference, a black diamond in FIG. 16 represents an example where when the number Z2 of teeth of the pinion P is 12, the number-of-teeth ratio Z1/Z2 and d2/PCD are set at 48/12 and 20.00%, respectively, and a black triangle in FIG. 16 represents an example where when the number Z2 of teeth of the pinion P is 12, the number-of-teeth ratio Z1/Z2 and d2/PCD are set at 70/12 and 16.67%, respectively. A result of a simulation for strength analysis on these examples has confirmed that the gear strength equal to or greater than those of the conventional differential devices (more specifically, the gear strength equal to or greater than 87% of the gear strength of the reference differential device D') were obtained. Moreover, these examples fall within the specific area, as shown in FIG. 16.

As comparative examples, let us show examples which do not fall within the specific area. A white star in FIG. 14 represents an example where when the number Z2 of teeth of the pinion P is for example 10, the number-of-teeth ratio Z1/Z2 and d2/PCD are set at 58/10 and 27.50%, respectively, and a white circle in FIG. 14 represents an example where when the number Z2of teeth of the pinion P is for example 10, the number-of-teeth ratio Z1/Z2 and d2/PCD are set at 40/10 and 34.29%, respectively. A white star in FIG. 16 represents an example where when the number Z2 of teeth of the pinion P is for example 12, the number-of-teeth ratio Z1/Z2 and d2/PCD are set at 70/12 and 27.50%, respectively, and a white circle in FIG. 16 represents an example where when the number Z2 of teeth of the pinion P is for example 12, the number-of-teeth ratio Z1/Z2 and d2/PCD are set at 48/12 and 34.29%, respectively. A result of a simulation for strength analysis on these examples has confirmed that the gear strength equal to or greater than those of the conventional differential devices (more specifically, the gear strength equal to or greater than 87% of the gear strength of the reference differential device D') were not obtained. In other words, the above effects cannot be obtained from the examples which do not fall within the specific area.

Although the embodiment of the present invention has been described, the present invention is not limited to the embodiment. Various design changes may be made to the present invention within a scope not departing from the gist of the present invention.

Figure 9:
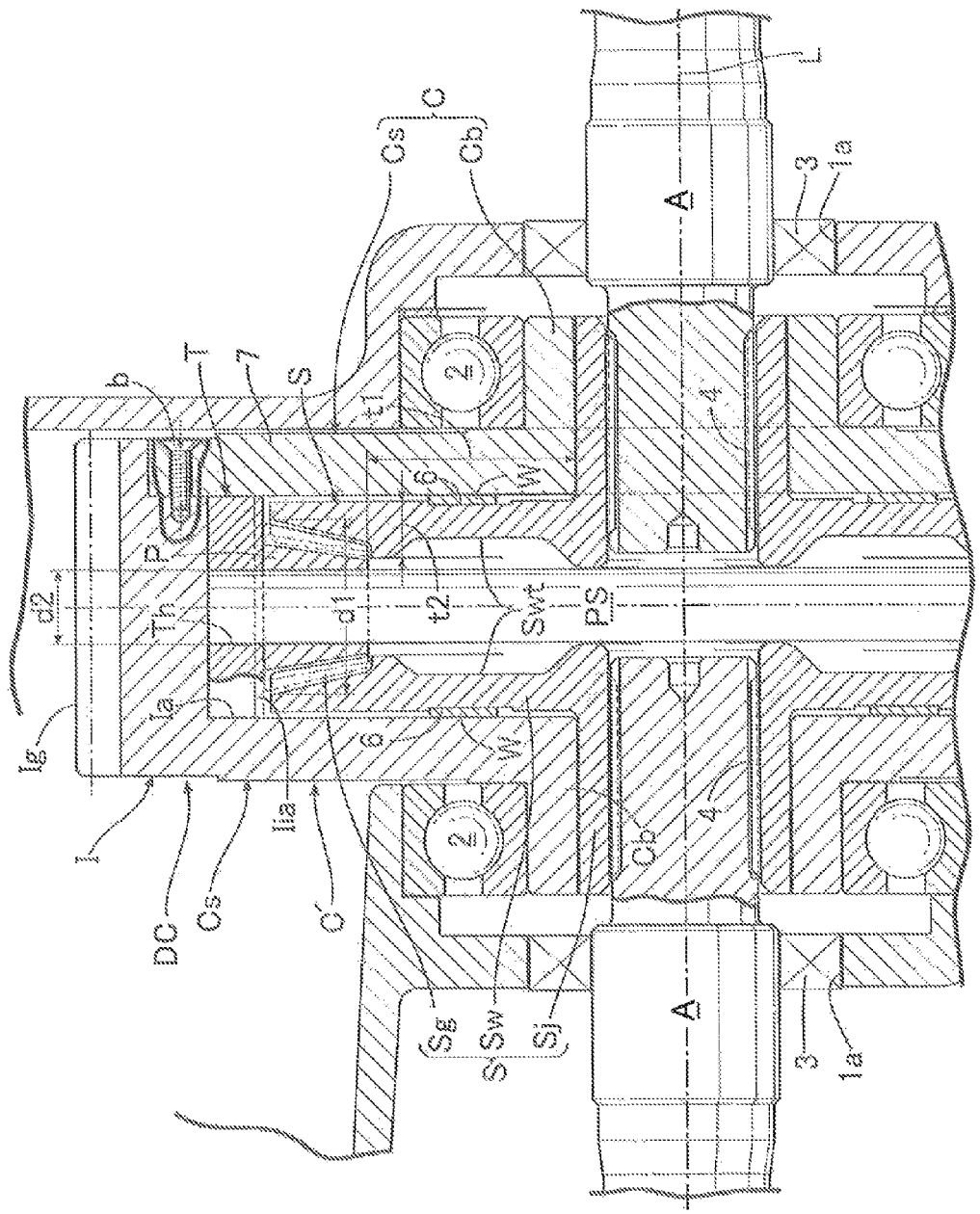
FIG. 9 is a partial sectional view showing a modified embodiment of the side gear and the cover portion in the differential device, and corresponding to FIG. 1.

For example, in any of the embodiments, in each side gear S, the thin portion Swt is formed by making the back surface side of the intermediate wall portion Sw retreat inward in the axial direction of the output shaft A. For example, however, in each side gear S, the back surface side of the intermediate wall portion Sw is formed as a flat surface flush with the back surface of the toothing portion Sg without making the back surface side of the intermediate wall portion Sw retreat inward in the axial direction, as shown in FIG. 9. In this case, the entirety of the inner side surface of the side wall portion Cs of each of the cover portions C, C' is also formed as a flat surface in which the inner periphery-side side wall portion Cso and the outer periphery-side side wall portion Csi are flush with each other.

In addition, although the embodiment where the lightening portions 8 are provided to the side wall portion Cs of at least the one cover portion C of the left and right cover portions C, C' has been shown, the lightening portions 8 may be formed in the side wall portions Cs of neither of the left and right cover portions C, C' so that each side wall portion Cs covers the entirety of the back surface of the corresponding side gear.

Furthermore, although the embodiment where the input member I integrally includes the input toothing portion Ig has been shown, a ring gear which is formed separately from the input member I may be fixed to the input member I later instead of the input toothing portion Ig. Moreover, the input member of the present invention may have a structure which includes neither the input toothing portion Ig nor the ring gear. For example, the input member I may be operatively connected to a drive member (for example, an output member of a planetary gear mechanism or a reduction gear mechanism, a driven wheel of an endless transmission belt-type transmission mechanism and the like) situated upstream of the input member I on the power transmission passage so that the rotational driving force is inputted into the input member I.

Moreover, the embodiment where the back surfaces of the pair of side gears S are covered with the pair of cover portions C, C' has been shown, however, in the present invention, the back surface of only one side gear S may be provided with the cover portion. In this case, for example, the upstream-situated drive member may be disposed on the side gear side provided with no cover portion so that the drive member and the input member are operatively connected to each together on the side gear side provided with no cover portion.

What is claimed is:

1. A differential device which distributively transmits rotational force of an input member to a pair of output shafts, the input member retaining a pinion support portion that supports a pinion and being rotatable together with the pinion support portion, the differential device comprising:
  a pair of side gears each having an annular toothing portion in mesh with the pinion in an outer peripheral portion and connected to the pair of output shafts, respectively; and
  a cover portion axially covering an outside of at least one side gear of the side gears and rotating integrally with the input member, wherein
  the pair of side gears include
    shaft portions connected to the pair of output shafts, respectively, and
    intermediate wall portions formed in a flat plate shape intersecting an axis of the output shafts, the intermediate wall portions integrally connecting the shaft portions to the annular toothing portions separated outward from the shaft portions in a radial direction of the input member, respectively,
  each intermediate wall portion is formed with a width in the radial direction which is greater than a maximum diameter of the pinion,
  the cover portion includes
    a boss portion concentrically surrounding the corresponding shaft portion, and
    a plate-shaped side wall portion connected to the boss portion and having an outer side surface as a surface orthogonal to the axis of the output shafts,
  wherein:
  a back surface of at least one of the intermediate wall portions and the annular toothing portion of the side gear is rotatably supported on an inner side surface of a corresponding one of the side wall portions of the cover portion,
  the input member includes an input toothing portion having a plurality of teeth extending in a direction substantially parallel to an axial direction of the output shafts, the input toothing portion configured to receive rotational force from a power source in an outer peripheral portion of the input member, and
  the side wall portion of the cover portion is disposed within a width of the input toothing portion in the axial direction of the output shafts.

2. The differential device according to claim 1, wherein the intermediate wall portion of at least one side gear of the pair of side gears is formed with a maximum thickness in an axial direction of the output shafts which is smaller than an effective diameter of the pinion support portion.

3. The differential device according to claim 2, wherein a relationship expressed by $d3 \geq 3.74 \cdot d2 + 20$ is satisfied, where d2 denotes an effective diameter of the pinion support portion and d3 denotes a load point length of the pinion.

4. The differential device according to claim 3, wherein
  the pinion and the toothing portion of each of the side gears are bevel gears, and
  relationships expressed by $Z1/Z2 \geq 2$, and $PCD \geq 6.17 \cdot (Z1/Z2) + 20$ are satisfied, where PCD denotes a pitch cone distance of the pinion, Z2 denotes the number of teeth of the pinion and Z1 denotes the number of teeth of the side gear.

5. The differential device according to claim 2, wherein the pinion and the toothing portion of each of the side gears are bevel gears, and relationships expressed by $Z1/Z2 \geq 2$, and $PCD \geq 6.17 \cdot (Z1/Z2) + 20$ are satisfied, where PCD denotes a pitch cone distance of the pinion, Z2 denotes the number of teeth of the pinion and Z1 denotes the number of teeth of the side gear.

6. The differential device according to claim 1, wherein a relationship expressed by $d3 \geq 3.74 \cdot d2 + 20$ is satisfied, where d2 denotes an effective diameter of the pinion support portion and d3 denotes a load point length of the pinion.

7. The differential device according to claim 6, wherein the pinion and the toothing portion of each of the side gears are bevel gears, and relationships expressed by $Z1/Z2 \geq 2$, and $PCD \geq 6.17 \cdot (Z1/Z2) + 20$ are satisfied, where PCD denotes a pitch cone distance of the pinion, Z2 denotes the number of teeth of the pinion and Z1 denotes the number of teeth of the side gear.

8. The differential device according to claim 1, wherein the pinion and the toothing portion of each of the side gears are bevel gears, and relationships expressed by $Z1/Z2 \geq 2$, and $PCD \geq 6.17 \cdot (Z1/Z2) + 20$ are satisfied, where PCD denotes a pitch cone distance of the pinion, Z2 denotes the number of teeth of the pinion and Z1 denotes the number of teeth of the side gear.

9. The differential device according to claim 1, wherein the cover portion comprises a first cover portion axially covering the outside of the at least one side gear of the side gears, and a second cover portion axially covering the outside of the other side gear of the side gears, and wherein the side wall portions of the first and second cover portions are disposed within the width of the input toothing portion in the axial direction of the output shafts, respectively.

10. A differential device comprising:
an input member into which driving force is input;
a differential gear support portion supported in the input member;
a differential gear supported on the differential gear support portion;
a pair of output gears in mesh with the differential gear and relatively rotatable to the differential gear; and
a cover portion axially covering an outside of at least one output gear of the output gears and rotating integrally with the input member, wherein:
each of the output gears includes
a shaft portion connected to a corresponding one of a pair of output shafts, and
a toothing portion in mesh with the differential gear,
the cover portion includes
a boss portion surrounding the shaft portion of the associated output gear, and
a side wall portion connected to the boss portion,
the input member has an input toothing portion having a plurality of teeth extending in a direction substantially parallel to an axial direction of the output shafts, the input toothing portion configured to receive the drive force in an outer peripheral portion of the input member, and
the side wall portion of the cover portion is disposed within a width of the input toothing portion in the axial direction of the output shafts,
and further wherein $$d2/PCD \leq 3.36 \cdot \left(\frac{1}{Z1}\right)^{\frac{2}{3}} \cdot \sin\left(\tan^{-1}\frac{Z1}{Z2}\right)$$

is satisfied, and $Z1/Z2 > 2$ is satisfied, where Z1, Z2, d2 and PCD denote the number of teeth of each of the output gears, the number of teeth of the differential gear, a diameter of the differential gear support portion and a pitch cone distance, respectively.

11. The differential device according to claim 10, wherein $Z1/Z2 \geq 4$ is satisfied.

12. The differential device according to claim 10, wherein $Z1/Z2 \geq 5.8$ is satisfied.

13. The differential device according to claim 10, wherein the cover portion comprises a first cover portion axially covering the outside of the at least one output gear of the output gears and a second cover portion axially covering the outside of the other output gear of the output gears, and wherein the side wall portions of the first and second cover portions are disposed within the width of the input member in the axial direction of the output shafts, respectively.

* * * * *